Figure 1:
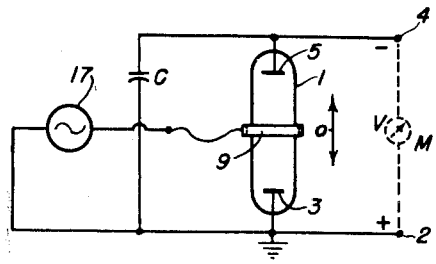

Dec. 7, 1954   K. S. LION ET AL   2,696,566
ELECTRIC TRANSDUCER SYSTEM
Filed Oct. 20, 1949   9 Sheets-Sheet 1

Inventors
Kurt S. Lion
John W. Sheetz 3rd
by Rines and Rines
Attorneys

Dec. 7, 1954  K. S. LION ET AL  2,696,566
ELECTRIC TRANSDUCER SYSTEM
Filed Oct. 20, 1949  9 Sheets-Sheet 2

Inventors
Kurt S. Lion
John W. Sheetz 3rd
by Rines and Rines
Attorneys

Dec. 7, 1954   K. S. LION ET AL   2,696,566
ELECTRIC TRANSDUCER SYSTEM
Filed Oct. 20, 1949   9 Sheets-Sheet 3

Inventors
Kurt S. Lion
John W. Sheetz 3rd
by Pines and Pines
Attorneys

Dec. 7, 1954  K. S. LION ET AL  2,696,566
ELECTRIC TRANSDUCER SYSTEM
Filed Oct. 20, 1949  9 Sheets-Sheet 4

Inventors
Kurt S. Lion
John W. Sheetz 3rd
by Pines and Pines
Attorneys

Dec. 7, 1954   K. S. LION ET AL   2,696,566
ELECTRIC TRANSDUCER SYSTEM
Filed Oct. 20, 1949   9 Sheets-Sheet 5

Inventors
Kurt S. Lion
John W. Sheetz 3rd
by Rines and Rines
Attorneys

Inventors
Kurt S. Lion
John W. Sheetz 3rd
by Rines and Rines
Attorneys

Dec. 7, 1954  K. S. LION ET AL  2,696,566
ELECTRIC TRANSDUCER SYSTEM
Filed Oct. 20, 1949  9 Sheets-Sheet 7

Inventors
Kurt S. Lion
John W. Sheetz 3rd
by Pines and Pines
Attorneys

Dec. 7, 1954    K. S. LION ET AL    2,696,566
ELECTRIC TRANSDUCER SYSTEM
Filed Oct. 20, 1949    9 Sheets-Sheet 8
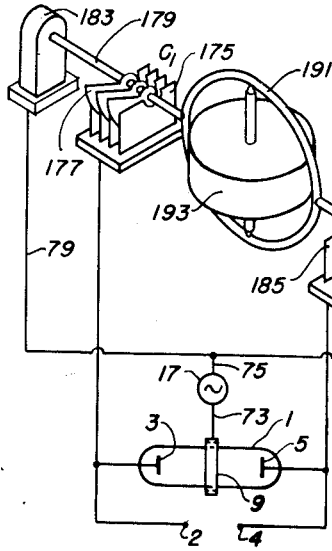
Fig. 40.
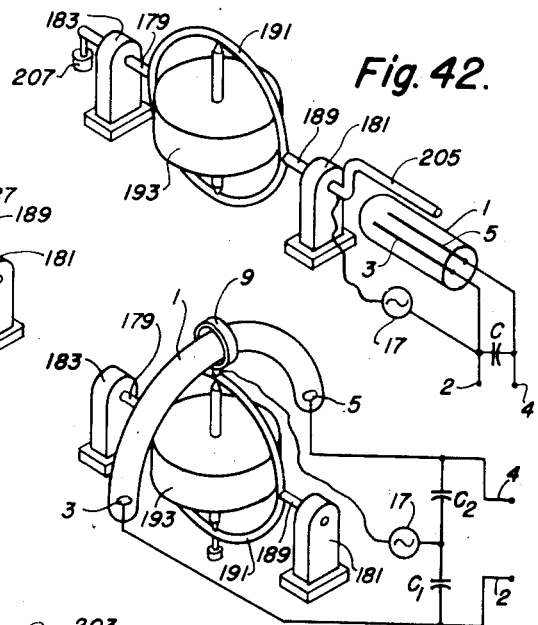
Fig. 42.
Fig. 43.
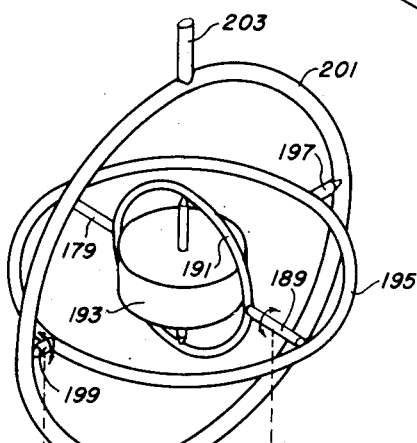
Fig. 41.
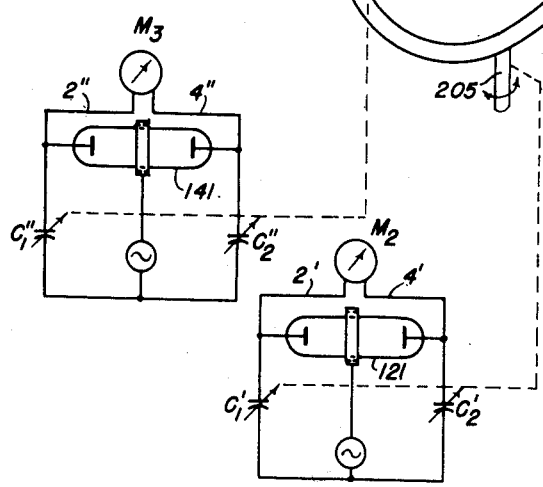
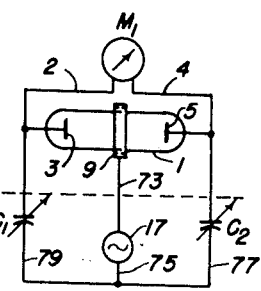
Inventors
Kurt S. Lion
John W. Sheetz 3rd
by Rines and Rines
Attorneys Dec. 7, 1954  K. S. LION ET AL  2,696,566
ELECTRIC TRANSDUCER SYSTEM
Filed Oct. 20, 1949  9 Sheets-Sheet 9

Inventors
Kurt S. Lion
John W. Sheetz 3rd
by Pines and Pines
Attorneys

_____

United States Patent Office 2,696,566
Patented Dec. 7, 1954

_____

2,696,566

ELECTRIC TRANSDUCER SYSTEM

Kurt S. Lion, Watertown, Mass., and John W. Sheetz 3rd, Fairlington, Va.

Application October 20, 1949, Serial No. 125,322

31 Claims. (Cl. 307—52)

_____

The present invention relates to electric circuits and more particularly to circuits employing discharge tubes. This application is a continuation-in-part of our copending application Serial No. 30,546, filed on June 2, 1948.

In the said copending application, it was disclosed that if an ionizable medium, such as a gas-filled tube, having two internal electrodes is inserted in an alternating-current field of sufficient intensity to produce an ionized discharge within the medium, such as, for example, in a sufficiently intense radio-frequency field, a direct-current voltage will be developed between the two electrodes even though there is no source of energy connected therebetween. The polarity and magnitude of this direct-current voltage is determined by the field distribution surrounding the tube. Regions of operation are described where variations in the field distribution produce substantially linear corresponding variations in direct-current voltage, as well as variations obeying other laws. Mechanical and electrical systems for varying the field distribution in accordance with a predetermined signal are also described, and some of these are reproduced here for completeness.

An object of the present invention is to provide new and improved circuits for producing these direct-current voltages from alternating electric fields.

Another object is to provide novel circuits for converting or transducing mechanical vibrations, forces or other motions into corresponding electrical voltages.

A further object of the present invention is to provide circuits of the character described adapted to operate in conjunction with a wide variety of control circuits.

Other and further objects will be explained hereinafter and will be more particularly pointed out in the appended claims.

In summary, the present invention is directed to novel electric systems of the type having, in combination, means comprising an ionizable medium, preferably a gaseous medium, provided with two electrodes between which potential gradients may be established to ionize the medium and an output circuit connected between the electrodes whereby a voltage may be produced in the output circuit in response to the ionization of the medium without the aid of a source of energy therein. Preferred constructions and circuits as well as preferred potential-gradient producing electric fields are treated in detail. The use of such systems as transducers under the control of a wide variety of signal-producing means or forces is hereinafter discussed, applications to servo-mechanism systems, gyroscope systems, telemetering and other measurement systems, as well as to other types of systems being particularly pointed out.

Figure 2:
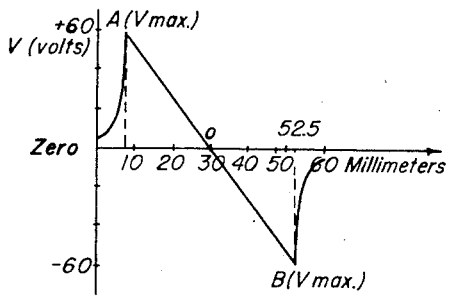
Figure 3:
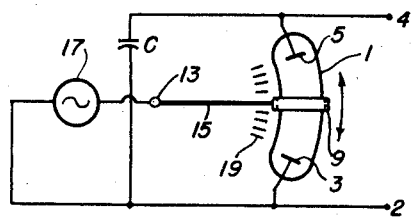
Figure 4:
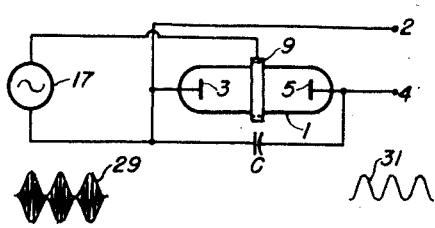
Figure 5:
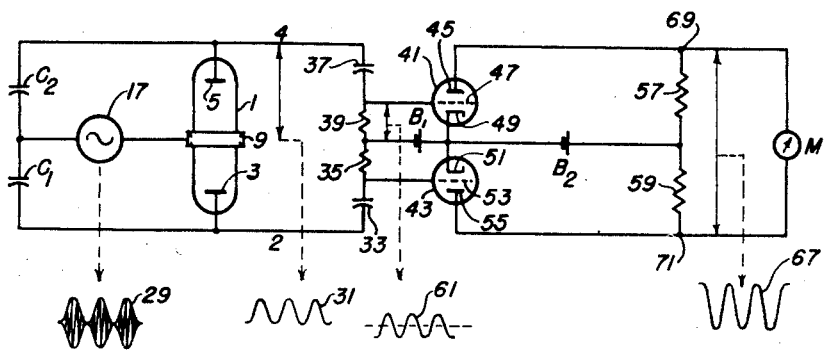
Figure 6:
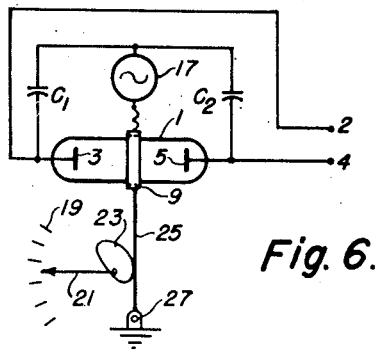
Figure 7:
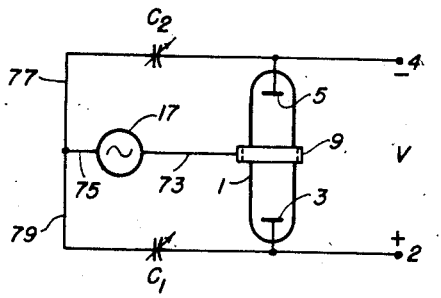
Figure 8:
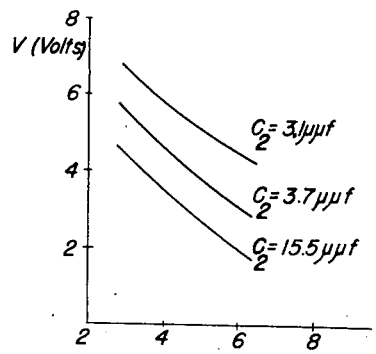
Figure 9:
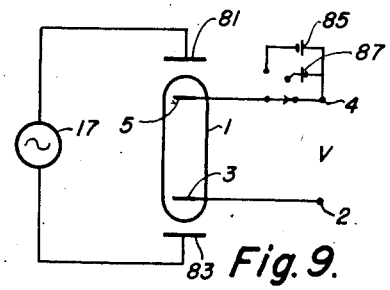
Figure 10:
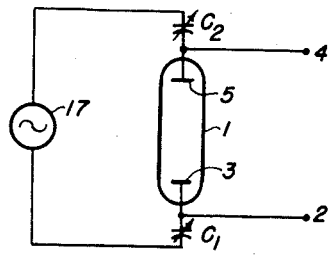
Figure 11:
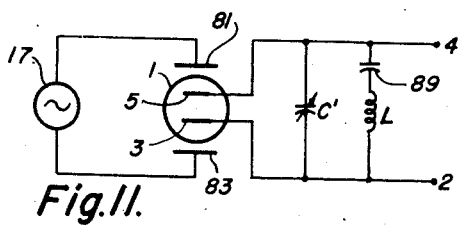
Figure 12:
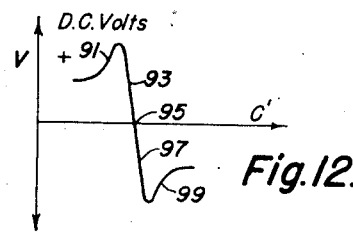
Figure 17:
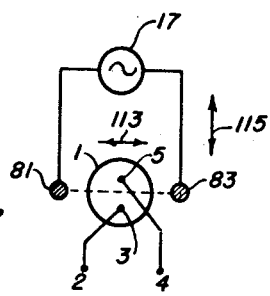
Figure 18:
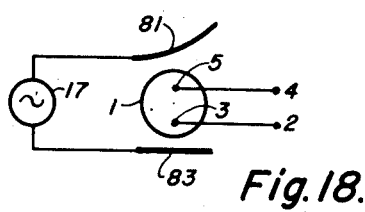
Figure 19:
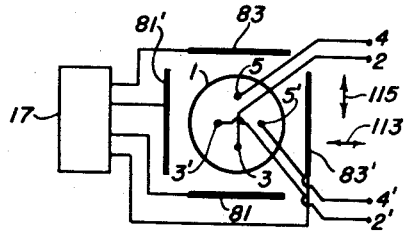
Figure 20:
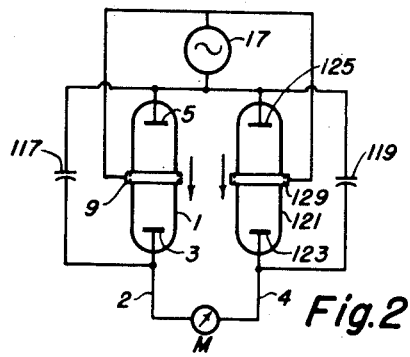
Figure 21:
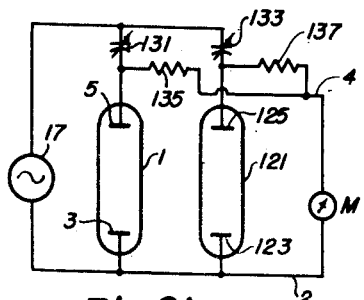
Figure 22:
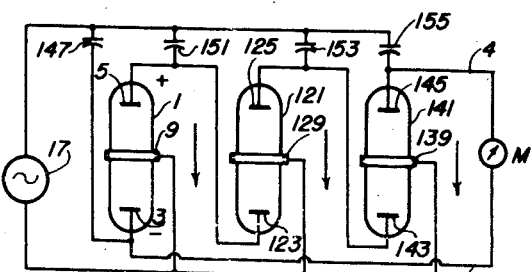
Figure 23:
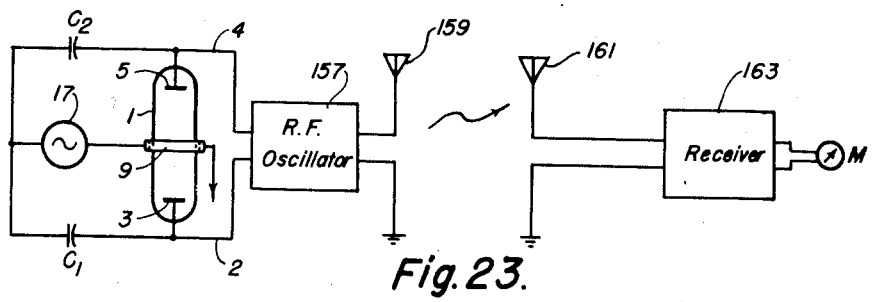
Figure 24:
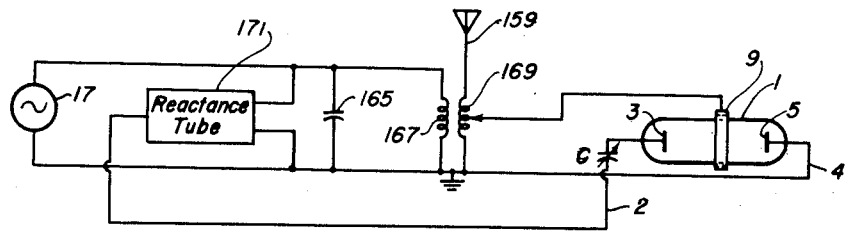
Figure 25:
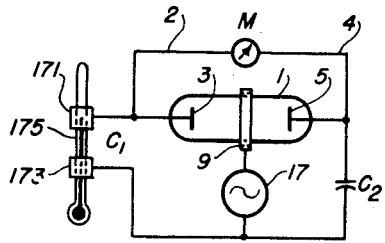
Figure 26:
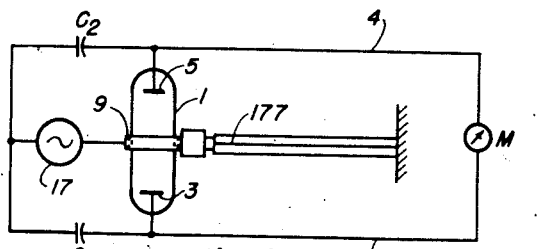
Figure 27:
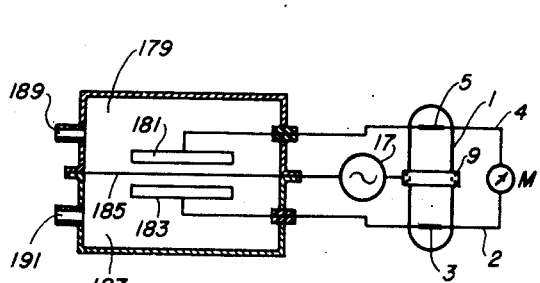
Figure 28:
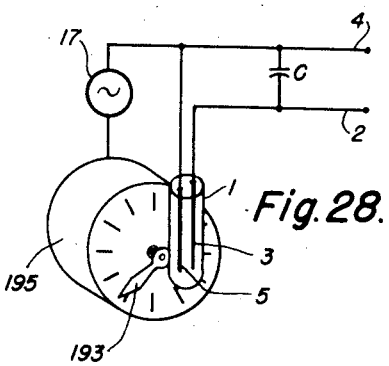
Figure 29:
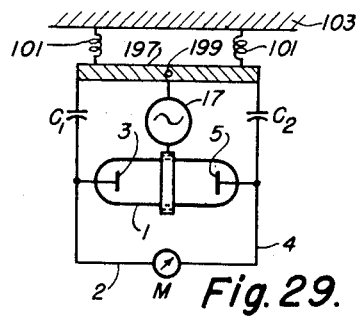
Figure 30:
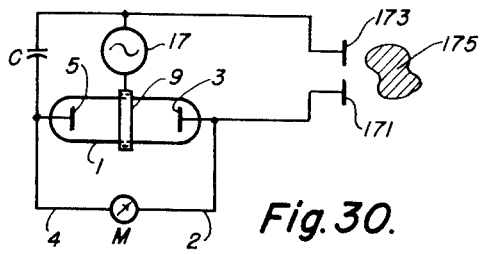
Figure 31:
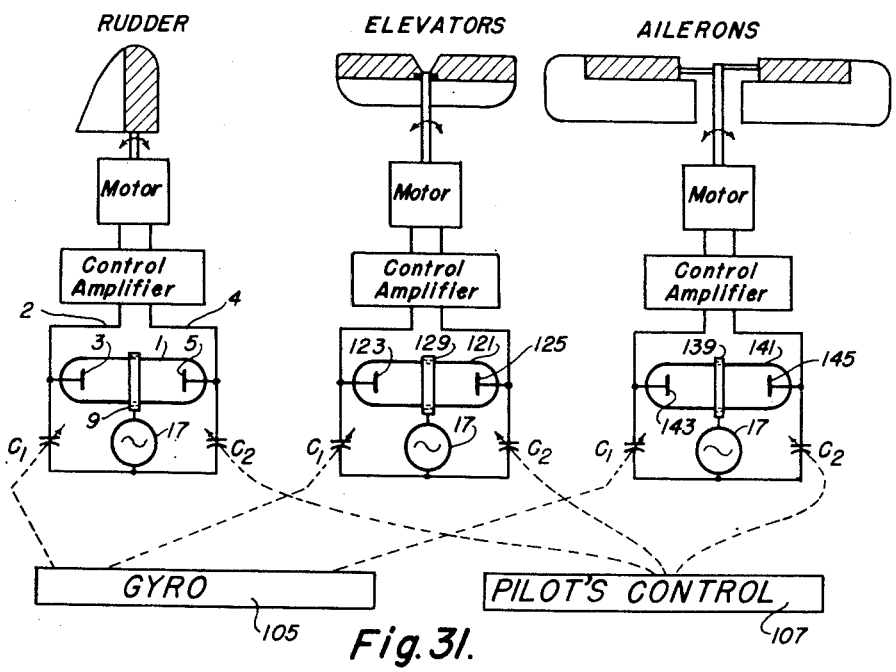
Figure 32:
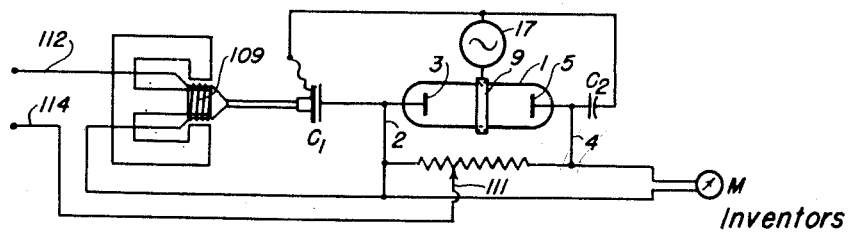
Figure 33:
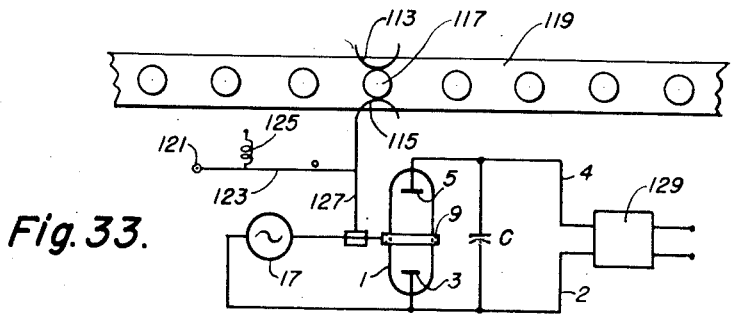
Figure 34:
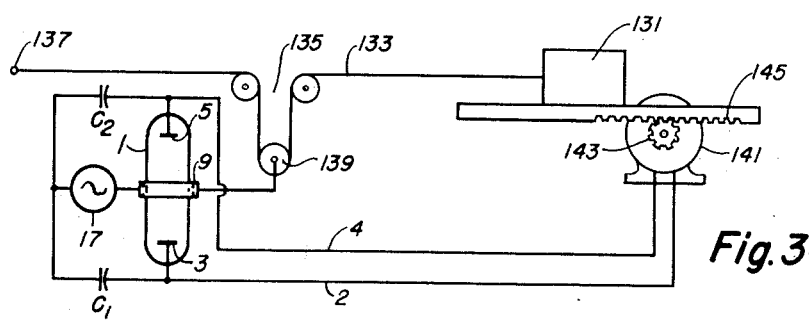
Figure 35:
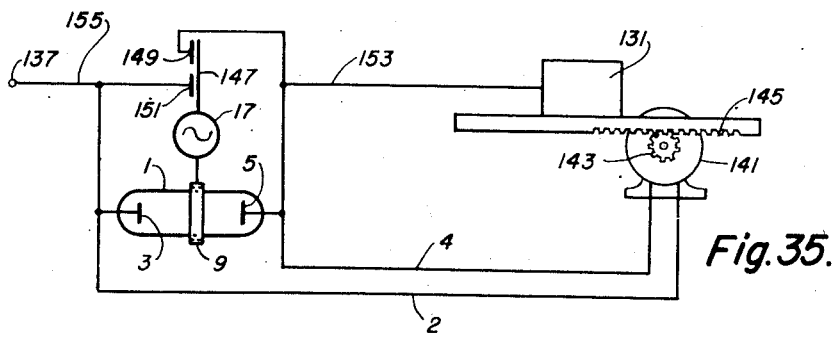
Figure 36:
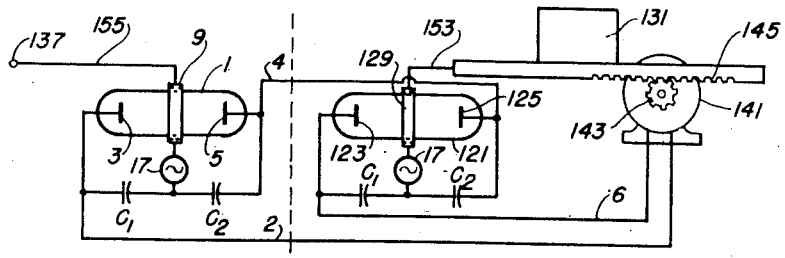
Figure 37:
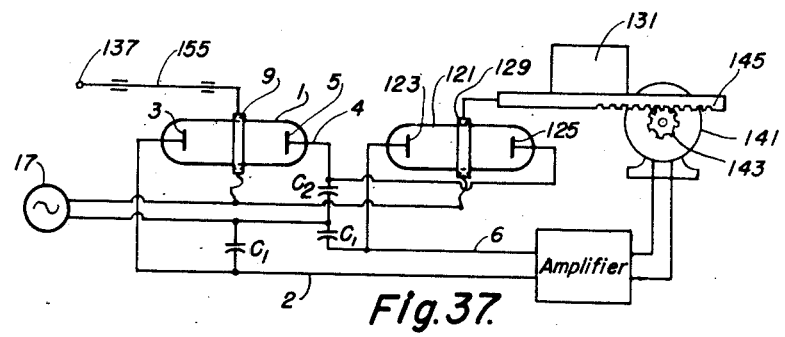
Figure 38:
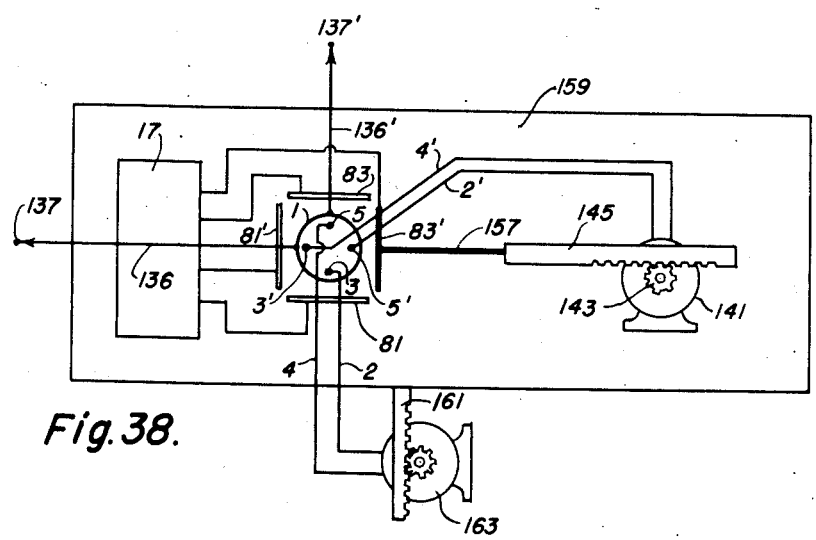
Figure 39:
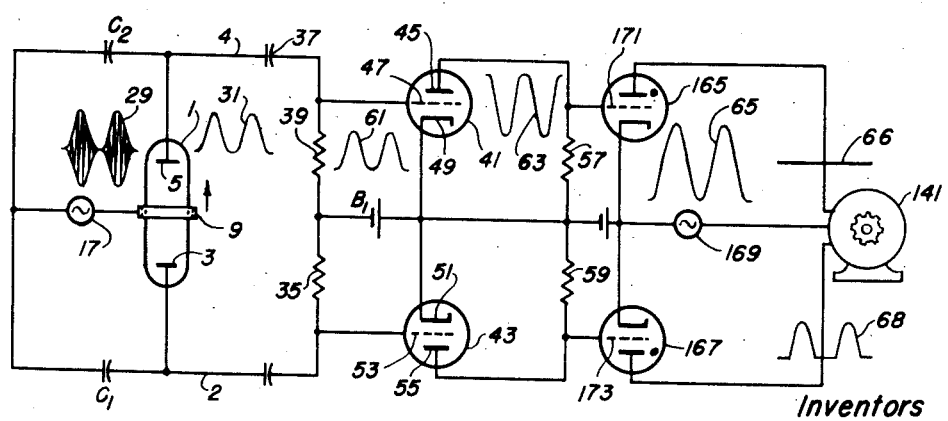
Figure 44:
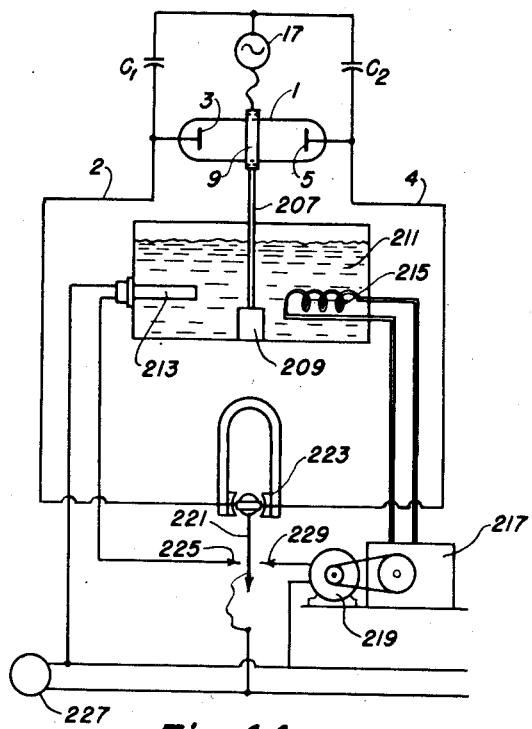
Figure 45:
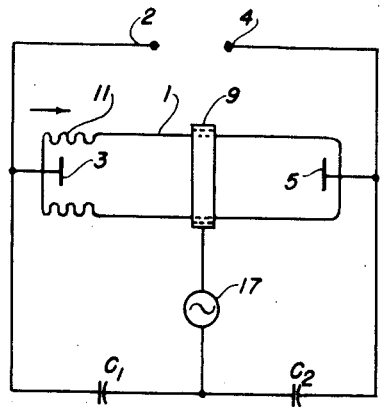
Figure 46:
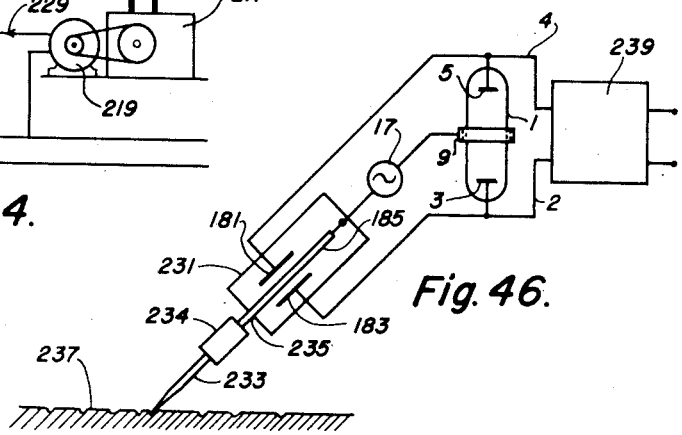
Figure 47:
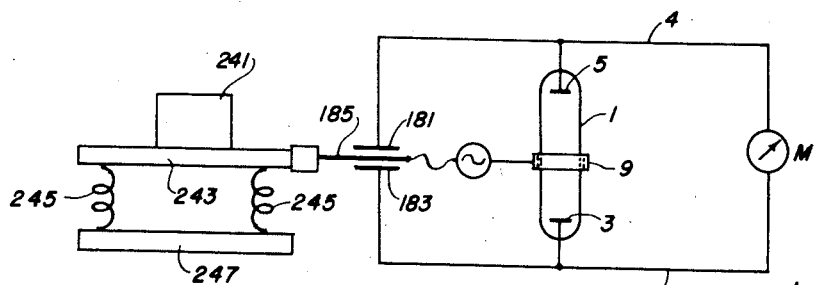

The invention will now be described in connection with the accompanying drawings, Fig. 1 of which illustrates a basic circuit diagram of an apparatus constructed in accordance with the invention described in the said co-pending application; Fig. 2 is an experimental plot of the sensitivity of the apparatus of Fig. 1; Fig. 3 is a modified apparatus for producing results similar to those obtained with the apparatus of Fig. 1; Figs. 4 and 5 are similar circuit diagrams of apparatus operated with modulated high-frequency fields in accordance with one of the novel features of the present invention, the apparatus of Fig. 5 being shown connected to a balanced amplifying system; Fig. 6 is a modification of the apparatus of Fig. 1 responsive to motions or movements produced in accordance with a predetermined law; Fig. 7 is a similar apparatus constructed in accordance with a preferred form; Fig. 8 illustrates experimentally obtained sensitivity curves of the apparatus of Fig. 7; Figs. 9 and 10 are circuit diagrams of modifications of the circuit of Fig. 7; Fig. 11 is a further modification employing a resonant output circuit and illustrating another feature of the present invention; Fig. 12 is an experimentally obtained curve illustrating the operation of the circuit of Fig. 11; Figs. 13 to 16 are further modifications of the apparatus of Fig. 7, Figs. 14 and 15 employing external ring electrodes; Figs. 17 to 19 are modifications of the circuit of Fig. 9, respectively illustrating movement in fields produced by wire electrodes, electrodes shaped in accordance with a predetermined law, and two-dimensional electrode arrangements; Fig. 20 illustrates a modified circuit employing a plurality of transducer elements arranged to produce voltages representative of the sum of or the difference between two mechanical displacements or other movements in accordance with a further feature of the present invention; Figs. 21 and 22 are modifications illustrating, respectively, parallel and series-connected apparatus adapted to indicate the sum of or the difference between two or more mechanical displacements or other movements; Figs. 23 and 24 are schematic diagrams illustrating the application of the apparatus of Figs. 1 or 7, or the various modifications thereof, as amplitude, frequency or phase modulators of a radio-frequency transmitter; Fig. 25 illustrates the apparatus of Fig. 7 under the control of an electrically varying temperature indicator; Fig. 26 shows the control of the apparatus of Fig. 1 by a mechanically varying temperature indicator; Fig. 27 is a schematic diagram of the apparatus of Fig. 7 controlled by a wind-velocity or pressure indicator; Fig. 28 is a similar diagram illustrating control by a clock, meter, counter, indicator or similar device; Fig. 29 illustrates the control of the circuits of the present invention by an angular accelerometer; Fig. 30 illustrates control effected in accordance with the proximity of external objects; Fig. 31 is a diagram of a plurality of transducers constructed in accordance with the present invention and controlled by various moving portions of a vehicle, such as an aircraft or projectile; Fig. 32 shows the operation of the present invention as an amplifier of small voltages that are caused to effect mechanical displacements; Fig. 33 illustrates the apparatus of Fig. 1 adapted to indicate the size of objects carried upon a conveyor belt; Figs. 34 and 35 respectively illustrate apparatus of the type shown in Figs. 1 and 7, or the various modifications thereof, under the control of a servo-mechanism system; Figs. 36 and 37 are schematic diagrams of servo-mechanism systems embodying control and follow transducers; Fig. 38 illustrates the apparatus of Fig. 19 under the control of two-dimensional servo-mechanisms; Fig. 39 shows the preferred apparatus of Fig. 5 employed with thyratron control tubes; Figs. 40 and 41 illustrate the apparatus of Fig. 7 under the control of a gyroscope; Figs. 42 and 43 respectively illustrate gyroscopic control of the basic circuits of Figs. 1 and 3; Fig. 44 is a schematic diagram of a circuit similar to Fig. 7 under the control of a temperature indicator of the type shown in Fig. 26 cooperative with heating and cooling units for providing constant temperature; Fig. 45 is a modified apparatus in which a bellows is provided to permit the movement of one of the principal electrodes of the apparatus of Fig. 1, or of the various other embodiments; Fig. 46 shows a phonograph pick-up or other surface-measuring device controlling the apparatus of Fig. 7; and Fig. 47 illustrates a further modification of the circuit of Fig. 7 controleld by a strain gauge or accelerometer.

A gas-discharge tube is illustrated in Fig. 1 as provided with two principal preferably internal electrodes 3 and 5 spaced from one another in an envelope 1. The envelope 1 is preferably constituted of glass or similar electric-wave permeable material, though metal and other conducting envelopes may be employed under some circumstances, as will later be discussed. The principal electrodes 3 and 5 are shown as plane metal discs, but any electrode configuration, including thin wires, as shown in Figs. 17 to 19, 28 and 42, may be used.

The envelope 1 may be filled with any desired ionizable dielectric medium such as any well-known ionizable solid or, preferably, a gas under low, medium or high pressure. While helium and neon gas have been found to be particularly well-suited to the purposes of the present invention, any other gaseous media such as air, hydrogen, argon, krypton, mercury vapor, to mention but a few, may also be employed. The medium may, if desired, be sealed under pressure within the envelope 1, or it may be continuously maintained under pressure by means of a conventional vacuum system, not shown.

A third electrode 9, preferably in the form of a ring or band external to and surrounding the envelope 1, is shown movable from a center position O toward either end of the envelope 1.

An alternating or pulsating voltage hereinafter referred to as "alternating-current," oscillator 17 may be connected between the third or movable electrode 9 and the electrode 3, which may, if desired, be grounded, as shown. The oscillator or generator 17 is preferably a radio-frequency signal generator, though lower-frequencied oscillators of, for example, audio, ultasonic and video frequencies may be employed. The electrodes 3 and 5 are coupled at the radio or other alternating frequency of the oscillator 17 by the condenser C. An output circuit comprising conductors 2 and 4 is connected between the electrodes 3 and 5, and no source of energy such as a battery or other device is required in the output circuit. An indicator such as a meter M, shown dotted, may be directly connected across the output circuit 2—4. As explained in the said copending application, providing the peak voltage of the alternating potential impressed between the electrodes 3 and 5 produces a field sufficient to cause the gas or other medium in the tube 1 to ionize, a direct-current potential V will be produced between the electrodes 3 and 5 in the output circuit 2—4, in accordance with the phenomenon relied upon in the present invention, even though no battery or other source of energy is connected in the output circuit. A much smaller voltage is required to ionize a gas at radio frequencies than at lower frequencies so that the radio-frequency spectrum is particularly useful for this and for other reasons. At radio-frequencies, furthermore, relatively high-pressure gases, such as the before-mentioned helium and neon are preferable.

As the electrode 9 is moved closer to the electrode 3 than to the electrode 5, downward from the center position O in Fig. 1, the direct-current output voltage V will have the polarity shown in Fig. 1. When, on the other hand, the electrode 9 is moved closer to the electrode 5, upward from the center position O in Fig. 1, the reverse polarity will obtain in the output circuit 2—4. The magnitude of the voltage V, furthermore, within limits that will later be discussed, increases as the electrode 9 is moved closer to one or the other of the principal electrodes 3 or 5.

Fig. 2 is a reproduction of a characteristic curve that we have experimentally obtained with an air-filled tube similar to that shown in Fig. 1, operated under a pressure of 0.87 millimeters of mercury. The oscillator 17 was operated at a frequency of 23.2 megacycles with a root-mean-square (R. M. S.) amplitude of 100 volts, and was connected between the movable electrode 9 and the grounded electrode 3, as illustrated in Fig. 1. The capacitor C had a value of about 0.01 microfarad so that both of the principal electrodes 3 and 5 might be at ground potential with respect to the radio-frequency current of the oscillator 17, but only the electrode 3 would be at direct-current ground potential. The spacing between the principal electrodes 3 and 5 was about 60 millimeters. In Fig. 2, the direct-current voltage V obtained between the output terminals 2 and 4 is plotted along the ordinate as a function of the position of the movable electrode 9 from the center position O, shown at the 30 millimeter mark along the abscissa. When the electrode 9 was positioned exactly at the center position O, half-way between the principal electrodes 3 and 5, equal length, cone-shaped, elongated glow discharges were observed in the tube 1, glowing from a virtual electrode within the tube 1, corresponding to the electrode 9, towards each of the principal electrodes. For this condition, zero output voltage was measured in the output circuit between the terminals 2 and 4. Since the alternating field produced potential gradients between the electrode 9 and each of the principal electrodes 3 and 5 of equal magnitude and opposite polarity, a cancellation of current flow in the ionized gas was produced. As the electrode 9 was moved closer to the electrode 3, the glow discharge between the electrode 9 and the electrode 3 became of shorter length and more intense, while the glow discharge between the movable electrode 9 and the electrode 5 became longer and less intense. This potential gradient differential resulted because the impedance between the electrode 9, or its virtual electrode inside the tube 1, and the electrode 3 became less than the impedance between the electrode 9 and the other principal electrode 5. Since the potential gradients, therefore, between the electrode 9 and the electrode 3 became greater than the potential gradients between the electrode 9 and the electrode 5, a resultant current flow in the direction from the electrode 3 towards the electrode 5 was produced and a positive direct-current voltage V resulted between the terminals 2 and 4 in the output circuit. The magnitude of the voltage V increased positively as the electrode 9 approached the principal electrode 3. When, for example, the separation of the electrode 9 from the principal electrode 3 was 21 millimeters, a voltage V of 20 volts was produced; when the separation was 13 millimeters, 40 volts resulted; and for a separation of about 5 millimeters, a maximum positive voltage $V_{max}$ of 60 volts was produced, as shown at point A in Fig. 2.

By moving the electrode 9 from the center position O of the tube 1 towards the other principal electrode 5, the increased potential gradients between the electrode 9 and the electrode 5 became greater than the potential gradients between the electrode 9 and the principal electrode 3, producing a resultant current flow from the electrode 5 towards the electrode 3. A negative voltage V, therefore, resulted in the output circuit 2—4. Because of the approximate symmetry of the principal electrodes and of the tube structure, the magnitude of the negative voltage V as a function of the displacement of the electrode 9 from the center position O toward the principal electrode 5 was found to vary substantially in the same manner as the magnitude of the positive voltage V for the corresponding displacements of the electrode 9 from the center position O toward the principal electrode 3. Had the two electrode structures or the tube construction been unsymmetrical, however, different variations would have been produced. A maximum negative voltage $V_{max}$ of 60 volts was obtained when the electrode 9 was at a position 52.5 mm. from the electrode 3, or about 6.5 mm. from the electrode 5, as shown in Fig. 2.

A substantially linear variation of direct-current output voltage V from positive to negative values within limits of the adjustment of the electrode 9 from a position separated about 5 mm. from the principal electrode 3 to a position separated about 6.5 mm. from the other principal electrode 5, was produced in this particular tube. The sensitivity of the tube 1 in this operating region may be expressed in terms of the voltage V per millimeter of lateral movement or displacement of the electrode 9. The sensitivity of this particular tube was found to be about 2.5 volts per millimeter of displacement. If sign be disregarded, the tube sensitivity is about 5.0 volts per millimeter of displacement of the electrode 9. A very sensitive linear-position indicator or ultra-micrometer is thus provided. If, for example, a dimension of an article is to be measured to a high degree of accuracy, a scale would be of little value. If one end of the article is placed at a position adjacent one of the principal electrodes, for example, and the ring electrode 9 is moved to the other end of the article, however, the output voltage V will accurately measure the dimension of the article or variations in this dimension, as more fully discussed in the said copending application.

If the electrode 9 is moved from the center of the tube 1 continuously closer to one of the principal electrodes, therefore, a linear direct-current voltage increase is produced as the system transduces each unit of movement into voltage. Movement towards one principal electrode produces an increasing positive voltage, and movement towards the other electrode an increasing negative voltage. A point is reached, however, when, upon slight further movement of the electrode 9 towards the closer principal electrode, the longer and weaker gas discharge between the electrode 9 and the further principal electrode suddenly breaks away from the surface of the further principal electrode, and a sharp decrease in magnitude of the direct-current output voltage V is produced. The points where this sharp inversion takes place are designated at A and B in Fig. 2.

For the air-filled tube previously described, for example, point A was found to occur when the electrode 9 was about 5.0 millimeters from the principal electrode 3, and point B occurred when the electrode 9 was about 6.5 millimeters from the principal electrode 5. Movement of the electrode 9 just one millimeter closer to the electrode 3 from the point A produced a sudden voltage decrease of about 45 volts, while similar movement from the point B towards the electrode 5 produced a sharp 31-volt decrease. Further movement of the electrode 9 towards the closer principal electrode produced smaller and smaller output voltages. Some tubes that were tested displayed other minor points of voltage inversion in the region between, for example, the point A and the electrode 3, where further relatively narrow regions of voltage increase and decrease were obtained.

While the whole region A—B may be used for producing linear voltage variations corresponding to displacements of the electrode 9, the center of the tube may be used as a zero reference on opposite sides of which positive increasing and negative increasing voltages V may be produced. The circuits embodying the present invention, of course, need not be operated about a zero output voltage reference value, but may be operated at any desired reference value. If, for example, the electrode 9 is vibrated back and forth, preferably about the center of the tube 1, by any vibrating means, such as, for example, those later discussed in connection with Figs. 32 and 47, an alternating voltage may be produced in the output circuit 2—4 of peak magnitude linearly related to the vibrational displacement of the electrode 9. The frequency of periodicity of the polarity reversals of the output voltage bears no relation to the frequency or periodicity of the input voltage from the oscillator or generator 17, but is determined by the frequency of vibration of the electrode 9. The ring 9, as a further example, has been mounted on the cone of a loud speaker driven by an audio oscillator, not shown, and alternating voltages up to over 20,000 cycles were successfully produced.

Substantially linear operation over a somewhat more limited region may also be obtained, of course, on the very steep portion of the characteristic curve just to the left of the point A, or to the right of the point B, illustrated in Fig. 2.

If it is desired to operate the system with a fixed direct-current voltage output or with the electrode 9 at a predetermined position, and to indicate a variation from either of these conditions, the points A and B may be conveniently employed as operating points. Slight movement of the electrode 9 in either direction from the points A and B will sharply and markedly decrease the magnitude of the voltage V. The points A and B may easily be located again, furthermore, by peaking the voltage output. Since the slope of the voltage curve to the left of the point A or to the right of the point B has been found customarily to be steeper than the slope of the linear portion A—B, as shown in Fig. 2, the relative voltage changes per unit movement of the electrode 9 may indicate in which direction the electrode has moved from the point A or B.

We have found that, if, in a given tube, the pressure of the gas is increased, the slope of the linear portion A—B will, in general, increase also, producing greater tube sensitivity. The increase in pressure, however, usually decreases the value of the maximum output voltage $V_{max}$ at points A and B, and decreases the length of the region of the tube over which the linear characteristic A—B occurs.

As an illustration, for one particular experimental tube, a variation of tube sensitivity or slope of the characteristic curve with pressure of the gas within the tube was measured between 0.86 millimeters of mercury pressure to 2.2 millimeters pressure. Within this range, the tube sensitivity increased from 1.08 volts per millimeter deflection of the movable electrode 9 to 1.59 volts per millimeter deflection, and the increase was substantially linear. If, therefore, movements of the electrode 9 do not produce large enough direct-current voltages in the output circuit 2—4, the pressure of the gas in the tube 1 may be changed to increase the tube sensitivity.

It should be understood that the same phenomenon previously described, may be produced by keeping the electrode 9 fixed and by varying the potential gradients between the electrode 9 and the principal electrodes by other means. One or both of the principal electrodes may, for example, be inserted into the envelope 1 through well-known airtight bellows, as discussed in the said co-pending application, so that either or both of the principal electrodes themselves may be moved relative to the electrode 9. In Fig. 45, for example, the principal electrode 3 is shown movable in a conventional preferably gas-tight bellows 11 that is sealed to one end of the tube 1. With such a construction, the electrode 9 may be insetred within the envelope 1, and, indeed, the envelope 1 may be made of conducting material to shield the system from stray fields. The circuit of Fig. 45 is slightly different than, though fully equivalent to, that of Fig. 1, in that the generator 17 is shown connected to the principal electrodes 3 and 5 through the respective coupling condensers $C_1$ and $C_2$.

The present invention is not, however, limited to the transducing of linear movements into corresponding voltages. In Fig. 3, for example, the tube 1 is shown bent along an arc, and the electrode 9 is fixed to a conducting arm 15 so as to be movable along the arc of the tube 1 about a pivot 13. The oscillator 17 is connected on one side to the principal electrode 3 and on the other side through the pivot 13 and arm 15 to the ring electrode 9. The principal electrodes 3 and 5 are coupled by the condenser C in the same manner as discussed in connection with Fig. 1. Angular movements of the arm 15 and its associated ring electrode 9 as indicated upon a scale 19, for example, are thus converted into corersponding direct-current voltages in the output circuit 2—4. If the tube 1 is operated over its linear characteristic, moreover, angular movements will be transduced into proportional direct-current voltages.

While only linear and angular movements have thus far been discussed, it is to be understood that any kind of movements, describing any function or law, may be employed. In Fig. 6, as a further illustration, a cam 23, cut according to any desired law, is shown rotatable about a shaft 21. The rotation of the cam 23 may be indicated on an angular scale 19. As the cam 23 rotates, it displaces a lever 25 that is pivoted at one end about a pivot 27 and that carries the ring electrode 9 at the other end. By making the ring electrode 9 of sufficiently large diameter, it will not bind the tube 1 as it is displaced by the movement of the lever 25 in response to the action of the cam 23. The tube 1 may, indeed, be curved as previously discussed in connection with the system of Fig. 3. If the lever 25 is constituted of conducting material, it is preferably grounded at the pivot 27 as shown. The output voltage between the terminals 2 and 4 will thus vary in accordance with the function or law to which the cam 23 is cut. The circuit connections of the oscillator 17 to the tube electrodes are the same as those before discussed in connection with Fig. 45.

No matter what type of motions are employed with the transducer of the present invention, therefore, corresponding direct-current voltages may be produced without the aid of a source of energy, such as a battery, in the output circuit. Often it is desirable to amplify these direct-current output voltages. Conventional direct-current amplifiers may be employed, but they are attendant with drift and instability. In accordance with an important feature of the present invention, by modulating the radio-frequency or other oscillator 17, stable alternating-current amplifiers may be used as will now be discussed.

In Fig. 4, as an illustration, the oscillator 17 is shown modulated with a relatively low-frequency envelope 29. The modulation voltage signals may be of any desired type such as sine-waves, complex waves, pulses, and the like. If, as hereinafter discussed, the tube is operated over certain voltage and pressure ranges, it is substantially independent of both the frequency and the magnitude of the radio-frequency voltage of the oscillator 17. The modulation 29 will then not appear in the output circuit 2—4. Only a direct-current voltage representative of the amount of displacement of the center electrode 9 will result. If, on the other hand, the tube 1 is operated over other ranges, later described, where an increase in applied voltage produces an increase in output voltage, the modulation envelope 29 will be reproduced in the output circuit 2—4 as illustrated at 31. This output voltage 31 may be considered as a superposition of a direct-current voltage dependent upon the position of the ring electrode 9 and a new alternating-current voltage that depends upon the modulating voltage. The polarity of the voltage impulses depends upon the polarity of the direct-current voltage component which, in turn, is dependent upon the direction of displacement of the ring electrode 9 from its center position. The output voltage 31 may thus be amplified in stable alternating-current amplifiers, obviating the need for the more unreliable direct-current amplifiers. The pulsating voltage 31 may, on the other hand, if desired, be applied directly to a direct-current meter for measurement of the direct-current level.

A practical amplifying circuit is shown in Fig. 5, connected to the output terminals 2—4 of the tube 1 that is shown connected to a modulated radio-frequency oscillator 17 in the manner discussed in connection with Figs. 6 and 45. With the ring electrode 9 in its central position between the principal electrodes 3 and 5, no output voltage results in the output circuit. When the ring electrode is displaced, for example, closer to the principal electrode 5 than to the principal electrode 3, the modulated radio-frequency voltage 29 is converted into a positive pulsating direct-current 31, as before explained in the discussion of the operation of the system of Fig. 4. The output circuit 2—4 is connected through capacitance-resistance coupling to a pair of balanced alternating-current amplifier vacuum tubes 41 and 43. The output leads 2 and 4 are respectively connected through condensers 33 and 37 and resistors 35 and 39 to the respective input circuits of tubes 43 and 41. The resistor 35 is connected between the control-grid electrode 53 and the cathode 51 of the tube 43, and the resistor 39 is connected between the control-grid electrode 47 and the cathode 49 of the tube 41. A common biasing battery or other source B₁ may be used to bias the control-grid electrodes 47 and 53 negatively with respect to their associated cathodes 49 and 51, thus to maintain the tubes 41 and 43 normally cut-off. To attain these ends, the positive terminal of the biasing source B₁ is shown connected to a common junction of the cathodes 49 and 51, and the negative terminal is shown connected to a junction of the resistors 35 and 39. The plates 45 and 55 of the respective tubes 41 and 43 are connected through corresponding plate loads 57 and 59 to the positive terminal of a common plate-supply battery or other source B₂, the negative side of which is connected to the said junction of the cathodes 49 and 51. For the case of the electrode 9 located at the center of tube 1, the resulting positive impulses 31 will produce across the resistor 39 a voltage 61 pulsating about a zero direct-current level as a result of passage through the coupling condenser 37, periodically to drive the grid 47 of the tube 41 positive with respect to the cathode 49, thereby to overcome the bias of the battery B₁. Similarly, the tube 43 will be periodically rendered conductive in antiphase. Across the plate loads 57 and 59 of the tubes 41 and 43, therefore, there will appear no resultant voltage. When, however, the ring electrode 9 is moved closer to one of the principal electrodes than the other, the corresponding amplifier tube 41 or 43 will conduct more than the other amplifier tube, producing across the plate loads 57 and 59, between the terminals 69 and 71, accordingly, amplifier direct-current impulse voltages 67. A meter M connected between the terminals 69 and 71 may therefore indicate not only the amplified magnitude of the resulting output voltage 67, indicating the amount of displacement of the ring electrode 9 from the center of the tube 1, but also the polarity or direct-current level of the impulses 67, which indicates toward which principal electrode the electrode 9 has been displaced. If, on the other hand, the electrode 9 is moved closer to the other principal electrode, the amplified impulses in the meter M will be of polarity opposite to that shown at 67.

It is to be understood that the meter M may be replaced by a conventional cathode-ray-tube indicator, thyratron control tubes, as later discussed in connection with the embodiment of Fig. 39, or any other desired control circuit, indicator or load. Notwithstanding the presence of a superimposed direct-current voltage level, the amplified output in all cases will indicate not only the magnitude of displacement of the ring electrode 9, but also its direction of displacement. The circuit of Fig. 5 has been operated with a small neon-tube transducer 1 and with standard balanced amplifiers 41 and 43, producing extremely high sensitivity.

It has previously been mentioned that the principal electrodes may have any desired configuration or shape. We have, for example, successfully employed flat-disc electrodes as illustrated in Fig. 1, wire electrodes disposed parallel to the axis of the tube as illustrated in Fig. 28, rod electrodes and other electrode structures. Variations in the sensitivity of the tube, in the range of linear operation of the tube, in the maximum output voltage $V_{max}$ of the tube, and in other characteristics, of course, occur with different electrode designs and spacings. Under certain conditions, the sensitivity of the tube appears to decrease as the space between the electrodes is decreased. The sensitivity of the tube, in general, appears to increase with the increased electrode surface area. The reference or initial voltage in the output circuit and the value of $V_{max}$ also vary with electrode spacing.

Movable electrodes of any desired shape may also be employed. Narrow circular rings such as shown at 9 in Fig. 1, wider circular bands, wire-mesh electrodes, ring segments, flat metal electrodes, pointed electrodes and other electrode configurations have been successfully used. In one series of experiments, as an illustration, a movable ring electrode was employed with a helium-filled tube at 1.5 mm. pressure having two flat-disc principal electrodes spaced about 60 mm. apart and operating with a radio-frequency field of 40 megacycles frequency and of 100 volts R. M. S. A value of $V_{max}=26.4$ volts was produced as was a linear characteristic curve extending throughout very nearly the complete length of the tube. A quarter-ring segment electrode used with the same tube under the same operating conditions, while producing about the same sensitivity as the complete ring, provided a linear characteristic along only half as much of the tube, and produced a maximum output voltage of about 14 volts. A pointed electrode, on the other hand, produced a sensitivity curve having only about a third the slope of that obtained with the ring electrodes, and a value of $V_{max}=4.7$ volts. To the left of the invention point A, as well as to the right of the point B, in this last-named characteristic curve, in addition, the magnitude of the voltage V decreased sharply with movement of the movable electrode as shown in Fig. 2. For further electrode movement, the voltage changed polarity and then a second point of voltage inversion was obtained. The pointed movable electrode, therefore, might be used where it is desired to have several points of inversion, while the complete ring or band electrode could be used to provide long and sensitive linear characteristics.

Depending upon the needs of the application to which the present invention is to be put, furthermore, envelopes of different shape, length and cross-dimensions and containing different gases or other ionizable media may be used, as previously discussed. At microwave frequencies, as a further example, the tube dimensions or electrode spacings may be conveniently made resonant to the frequency of the micro-wave field.

Variations in potential gradients within the tube may also be produced electrically, as by connecting the tube into two arms of a variable-impedance bridge circuit of the type described in the said copending application and illustrated in Fig. 7. A tiny "pea"-type neon tube 1, for example, having internal electrodes schematically shown at 3 and 5, has been found admirably suited to the purposes of the present invention, when provided with an external metal-band electrode 9. The alternating-field generator 17, having a voltage sufficient to ionize the tube 1, may be connected by conductor 73 to the external electrode 9, and by a conductor 75 to further conductors 77 and 79. These connections constitute the input circuit of the bridge. Conductor 77 is preferably connected through a condenser $C_2$ to the principal electrode 5; and conductor 79 is preferably connected through a condenser $C_1$ to the principal electrode 3. The direct-current output circuit 2—4 is shown connected across the principal electrodes 3 and 5.

Assume first, that the bridge arms containing condensers $C_1$ and $C_2$ have equal capacity and that the electrode 9 is maintained fixed in a position preferably symmetrical with respect to the principal electrodes 3 and 5. The principal electrodes 3 and 5 are then at the same alternating field strength with respect to the electrode 9 because of the physical and electrical symmetry of the principal electrodes and the electrode 9. No resultant current flow occurs between the principal electrodes 3 and 5 and there is then no output voltage V in the output circuit 2—4. Any desired initial resultant current and voltage may, of course, be produced by appropriate initial physical or electrical asymmetry. If, now, the value of the capacitance $C_1$ is changed, say an increase, the impedance between the principal electrode 3 and the electrode 9 decreases. The glow discharge between the electrode 3 and the electrode 9 becomes stronger than the discharge between the electrode 5 and the electrode 9, since the potential gradients between electrode 9 and each of the principal electrodes are no longer of equal magnitude. A resultant current flow from the electrode 3 to the electrode 5 thus takes place and a positive direct-current voltage V appears across the output circuit 2—4, as indicated. This has been found to be substantially equivalent to displacing the movable electrode as described in connection with Figs. 1 to 6. The creation of more intense glow discharges between one of the principal electrodes and the electrode 9 may be observed in the tube as occurring in exactly the same manner as when the electrode 9 itself is physically moved.

Regions of substantially linear relationship between the change in capacitance $C_1$ or $C_2$ and the resulting change in direct-current output voltage V have been found, similar to a portion of the region A—B shown in Fig. 2. Since different magnitudes of radio-frequency voltage from the source or generator 17 result at the electrodes 3 and 5 because of the differing impedance elements $C_1$ and $C_2$, however, the actual voltage V appears to be a half-cycle voltage pulsating between zero volts and a maximum unipolar peak value dependent upon the amount of impedance difference between the elements $C_1$ and $C_2$. If $C_1$ is greater than $C_2$, the pulsating voltage rises positively from zero volts, while if $C_2$ is greater than $C_1$, the pulsating voltage rises negatively from zero volts. The output voltage of the circuit of Fig. 7, therefore, may in same cases actually be amplified in alternating-current amplifiers without the need for modulating the generator 17 as discussed in connection with the electrode-moving systems of Figs. 1, 4 and 5. The generator 17 in Fig. 7, however, may, if desired, be modulated to produce the above-described output voltage V following the modulation envelope. In the system of Fig. 5, for example, the condensers $C_1$ and $C_2$ may be varied, as shown in Fig. 7, instead of or in addition to moving the ring electrode 9.

In the graph of Fig. 8, the sensitivity of an experimental bridge circuit employing a tube similar to the tube shown in Fig. 1 in a circuit similar to that illustrated in Fig. 7 is plotted. A 25-megacycle oscillator frequency was employed in this test and the variation of voltage V with various settings of the capacitance $C_1$ was measured for different fixed values of $C_2$. A sensitivity of about one volt direct-current voltage output per $10^{-12}$ farads capacitance change was obtained in this test. More sensitive results have, however, been obtained. The sensitivity, furthermore, was found to be substantially independent of the fixed position of the electrode 9, within certain limits. With an amplifier having a noise level of about $10^{-5}$ volts connected across the output circuit 2—4, changes in capacity of the order of $10^{-17}$ farads may be detected.

If, therefore, the variable condenser plates $C_1$ are moved, oscillated, or rotated to produce more or less capacitance, as hereinafter discussed in connection with the systems of Figs. 32 and 40, as illustrations, the same effect takes place in the tube 1 and in the output circuit 2—4 as is produced by the movement of the electrode 9 in Figs. 1 to 6. The circuit of Fig. 7, therefore, may be employed in the same manner as those discussed in connection with the embodiments of Figs. 1 to 6. It is to be understood that whatever the motion of the electrodes will do in the embodiments of Figs. 1 to 6, the variation in impedance, shown as capacitance, of the circuit of Fig. 7 will also do. The use of capacitance variations, moreover, permits the universal use of the circuit with discharge media of any desired dimensions and shape and provides, also, the advantages of easier, more convenient and more accurately controllable operation. Though various devices employing these circuits have been and are hereinafter illustrated in the present application as applied to one only of these embodiments, this is only in order to simplify the disclosure, for these devices may similarly be embodied in the circuits of the other embodiments.

It is not necessary, however, that the circuit of Fig. 7 be limited to capacitances alone. Any impedance means may be employed, such as, for example, resistors or inductors, not shown. Non-linear impedance elements such as photoelectric cells or mosaics may also be employed, since sensitivity calibration curves may be used to interpret the output voltage V.

An unknown capacity $C_2$ may be readily measured in the simple bridge circuit of Fig. 7 by varying the capacitance $C_1$, as previously described, to produce a desired reference voltage. It is sometimes preferable, however, to employ a known fixed capacitance $C_2$ and to insert the unknown capacitance in place of $C_1$. The value of V obtained would then yield the value of the unknown capacitance from a calibration curve similar to those illustrated in Fig. 8. This method of measurement is particularly valuable in determining the value of very small capacitances or in measuring condensers to a high degree of accuracy.

If the elements $C_1$ and $C_2$ are both variable condensers whose movable plates are 180 degrees out of phase and mounted on the same shaft, as later described in connection with Fig. 40, or if they cooperate with a common movable condenser plate, as later described in connection with Fig. 27, so that an increase in $C_1$ is accompanied by a corresponding decrease in $C_2$, providing differential capacitance operation, double the sensitivity may be obtained. As the impedance between one principal electrode and the electrode 9 decreases, and the potential gradients therebetween are correspondingly increased, the impedance between the other principal electrode and the electrode 9 increases instead of remaining at the same value, with a corresponding decrease in potential gradients. A greater sensitivity still may be obtained by mechanically ganging or otherwise moving condenser plates in synchronism with the movable electrode 9, as explained in the said copending application, to provide a four-way control over the sensitivity of the tube. The invention is not, of course, limited to the sensitivity provided by a four-way control, for there may be additional variable impedance elements, as discussed in connection with the systems of Figs. 13 to 16, as well as additional movable electrodes, as beforementioned.

With the external variable impedance or other means for varying the potential gradients within the tube, such as disclosed in the bridge circuit of Fig. 7, the electrode 9 may be disposed within the envelope 1 and the envelope 1 may be constituted of conducting material to shield the tube from stray fields and even to constitute a cavity resonator.

One of the important features of the present invention, before mentioned briefly, is that over relatively wide limits of position of the electrode 9 or variation of the capacitance $C_1$ or $C_2$, the operation of the various embodiments of the invention may be substantially independent of voltage or frequency variations of the oscillator or generator 17. The direct-current output voltage V has been found to remain substantially constant over a broad band of operating frequencies or wavelengths of the oscillator 17, for a given position of the electrode 9 of Fig. 1 within the limits A—B, Fig. 2, or for an adjustment of the capacitance $C_1$ or $C_2$ in Fig. 7. A constant response, for example, from about 28 meters to about 82 meters wavelength was found in one test with an 80-volt alternating field and a helium gas-filled tube under 1.98 millimeters pressure. While the length of the linear portion A—B of the characteristic curve, however, may sometimes vary with frequency, so that $V_{max}$ may be different for different frequencies, frequency bands have been found over which a substantially constant $V_{max}$ may be obtained. In a further test with the above-mentioned tube, for example, a constant value of $V_{max}$ was obtained from about 15 megacycles to about 45 megacycles with a slightly lower alternating field of 75 volts R. M. S.

Variations in R. M. S. voltage of the oscillator 17 within certain limits similarly will not affect the voltage V. With the location of the electrode 9 of the tube discussed in connection with Fig. 1 at the 21.8 mm. point, Fig. 2, for example, the R. M. S. value of the 26.5 megacycle oscillator voltage may be varied from 150 volts down to 100 volts with no substantial change in the value of the output voltage V. Over substantially the same range, the sensitivity of the tube remains substantially constant, also. With the electrode 9 close to one of the principal electrodes, however, variations of the voltage V with voltage of the oscillator have been detected.

Operation within the frequency bands and the voltage bands over which the system is substantially independent of frequency and voltage, is extremely valuable in the bridge circuit embodiments of the present invention. None of the usual compensating circuits or refined control circuits are needed to prevent frequency drift or variations in voltage of the alternating current generator that upset the calibration of conventional bridge circuits.

If, on the other hand, it is desired purposely to increase or decrease the sensitivity of the tube by varying the frequency, frequency bands have been found over which an increase in frequency, as an illustration, will produce an increase in the slope of the characteristic curve A—B. Other frequency bands have also been observed, furthermore, over which the value of V and the value of $V_{max}$ will vary substantially linearly with frequency. Such a region was found from 2.57 to about 8 megacycles, for example, in a tube similar to the one illustrated in Fig. 1, operated at 1.93 mm. pressure and with a 75-volt alternating field.

Similarly, the system may, if desired, be operated between voltage limits within which the value of $V_{max}$ increases with increasing R. M. S. voltage of the oscillator 17. We have found, as an illustration, a substantially linear variation of $V_{max}$ with an applied alternating-current field of 26.5 megacycles frequency in a tube of helium under 1.60 mm. pressure. This variation was from $V_{max} = 12.5$ volts at 108 volts R. M. S., to $V_{max} = 40$ volts at 146 volts R. M. S.

By adjusting the frequency or the applied voltage, therefore, operating regions having almost any desired characteristic, including substantially constant, linear, square, cubic or exponential characteristics, as illustrations, may be produced. The selection of the gas, the gas pressure, the electrode structures, the positioning of the electrodes, the tube dimensions, etc., afford further means for producing the desired sensitivity and response, as previously discussed in detail. The present invention thus provides for extremely flexible systems.

If the electrode 9 be omitted, and the tube 1 with its principal electrodes 3 and 5 be properly oriented in an alternating electric field sufficient to strike a glow in the tube, as discussed in the said copending application, such as, for example, in the field between the fixed external plate auxiliary electrodes 81 and 83 of Fig. 9 or in a radio-frequency radiation field, the direct-current voltage V will be produced in the output circuit 2—4 whenever one principal electrode is subjected to a higher electric field strength than the other principal electrode. The envelope 1, as an illustration, may be oriented with its long axis substantially parallel to the lines of electric force produced between the two preferably fixed condenser plates 81 and 83, shown vertical for purposes of illustration. When the envelope 1 is symmetrically located between the plates 81 and 83, the two principal electrodes 3 and 5 will be at the same field strength, and potential gradients of equal magnitude will be developed between the electrode 3 and the center of the envelope 1 and between the electrode 5 and the center of the envelope 1. A uniform ionization glow will be struck through the envelope and no resultant direct-current voltage V will be produced in the output circuit 2—4. As, however, the envelope 1 is moved downward, for example, the electrode 3 will be subjected to a higher field strength than the electrode 5, and the potential gradients between each electrode and the center of the tube will no longer be the same. The glow discharge in the lower portion of the envelope 1 will be brighter than the glow discharge in the upper portion of the tube. A resultant current flow will thus take place in the tube 1 from the electrode 3 to the electrode 5, producing a positive voltage V in the output circuit 2—4. Similarly, if the tube 1 be moved upward within the alternating field, a negative voltage V will be produced. The characteristic performance of such a system will correspond to that shown in Figs. 2 and 8 as the tube is moved up and down in the alternating field. This is fully equivalent to varying the condensers $C_1$ and $C_2$ in Fig. 7 since capacitance exists between the electrode 5 and the electrode 81 and between the electrode 3 and the electrode 83, corresponding, respectively, to the condensers $C_1$ and $C_2$. It should be understood, of course, that it is the relative movement of the tube 1 and the electrodes 81 and 83 that is important, so that the electrodes 81 and 83 may equally well be moved relative to a fixed tube 1.

With, for example, a ten millimeter tube 1, having wire electrodes 3 and 5 spaced about 30 millimeters apart and filled with argon gas at a pressure of about 0.8 millimeter, and with an 800-kilocycle generator 17 of about 5.5 watts output, direct-current output-voltage sensitivities have been obtained in excess of 500 volts per millimeter relative movement of the auxiliary electrode plates 81, 83 and the tube 1.

A convenient radiation field-strength indicator is thus also provided, which produces a direct-current indicating voltage in response to variations in field strength. Over a predetermined range, furthermore, a linear relationship between field strength and the direct-current indicating voltage may be obtained. By operating the tube 1 on a portion of its characteristic curve over which an approximate square-law variation occurs, such as in the region of the bends in the far left-hand or right-hand portions of the curve shown in Fig. 2, a voltage proportional to the energy or power of the field may be produced. The direct-current level upon which the output voltage V is superposed, furthermore, may be adjusted to any desired value as, for example, with the aid of biasing elements 85 and 87, as may the level of the output voltage of all of the other embodiments of the present invention. By this expedient, furthermore, a unidirectional output may be obtained regardless of whether the tube 1 moves in one direction or the other. If the generator 17 is of the modulated type, as discussed in connection with the systems of Figs. 4 and 5, the output voltage will comprise a superposition of the voltage of the biasing elements 85 or 87 and the pulsating voltage 31.

If the tube 1 is oscillated between fixed electrodes 81 and 83, as by connecting it to any desired vibrating means such as, for example, to vibrators of the type hereinafter described in connection with the embodiments of Figs. 32 or 47, an oscillating voltage will result in the output circuit 2—4 of frequency dependent upon the frequency of the movement of the tube 1, and of peak magnitude determined by the furthest displacement of the tube 1 from symmetry in the field produced between the electrodes 81 and 83. If, furthermore, the generator 17 is modulated, as discussed in connection with Figs. 4 and 5, then a beat frequency resulting from the mixing of the pulsating modulation direct-current voltage 31 and the mechanical oscillation frequency of the tube 1 will result in the output circuit. This mode of operation has particular advantage where variable modulation of the oscillator 17 may be employed and where it is desired to obtain the frequency of mechanical oscillation of the tube 1 by the beat frequency before mentioned. The beat frequency is an indication proportional to the difference of the mechanical oscillating frequency of the tube and the modulation frequency of the radio-frequency source 17.

In Fig. 17, external wire or rod auxiliary field electrodes 81 and 83, are employed instead of plate electrodes, to provide a symmetrical field with respect to a horizontal line, shown dotted, connecting the centers of the external electrodes 81 and 83. With wire principal electrodes 3 and 5 of the tube 1 disposed symmetrically with respect to the dotted horizontal line, as illustrated, no output voltage will be produced for any movement of the tube 1 horizontally in the direction of the arrows 113. Vertical displacement of the tube in the direction of the arrows 115, on the other hand, will cause different field strengths to be set up at the principal electrodes 3 and 5, resulting in a direct-current output voltage of magnitude dependent upon the amount of vertical displacement in the direction of the arrows 115. Since the field produced between the external electrodes 81 and 83, above and below the said horizontal line, is not linear, but, rather, varies in accordance with a function determined by the geometry of the system, (in this case, producing the well-known electric-intensity pattern occurring between parallel-wire transmission lines, as discussed, for example, on pages 47 to 57 of Electric Circuits, M. I. T. Staff, John Wiley & Sons, 1940), the magnitude of the output voltage produced upon vertical displacement of the tube 1 is also dependent upon the horizontal position of the tube in the direction of the arrows 113 from the center of the said horizontal line. The polarity of the output voltage is dependent on the direction of vertical displacement with respect to the dotted horizontal line. This system, therefore, provides for producing voltages representative of displacements of the tube 1 and varying in accordance with a function of two directions of motion or displacement, such as, for example, in accordance with the product of the motions in both directions.

By properly shaping the auxiliary electrodes 81 and 83, moreover, or otherwise modifying the field between them, the output voltage may be thus related by any desired predetermined function to the displacement, position or motion of the tube 1. If, for example, the electrodes 81 or 83 or both are shaped to produce an electric field representative of a predetermined function, movement of the tube 1 in the field in one direction will produce direct-current voltages varying in accordance with the said function. In the system of Fig. 18, as an illustration, the auxiliary electrode 81 is curved upward in accordance with a predetermined function, such as a square law. The principal electrodes 3 and 5 of the tube 1 are shown end on as wire or rod electrodes, the longitudinal axes of which are oriented substantially parallel to the plane of the bottom external field electrode 83. Horizontal and vertical movement of the tube 1 in the special function field distribution between the electrodes 81 and 83 will produce a direct-current output voltage in the output circuit 2—4 varying in accordance with the function. Linear horizontal movement, for example, may produce a voltage related to the square of the movement in the illustration, above. This may be considered an electrical analogue of the mechanical cam system of Fig. 6, before discussed.

In all of the transducers previously discussed, only two principal electrodes are employed. As discussed in the said copending application, however, more than two electrodes may be employed. If, for example, more than two principal electrodes are employed, two or more direct-current voltage outputs may be obtained indicating, for example, displacements or motions in two or more directions. In the system of Fig. 19, as an example, a pair of vertically disposed electrodes 3 and 5 will produce in the output circuit 2—4, direct-current voltages measuring the direction and magnitude of the vertical displacement 115 of the normally vertically centered tube 1 between the plane horizontally disposed external vertical-field-producing auxiliary electrodes 81 and 83 energized from a generator 17. Similarly, a pair of horizontal electrodes 3' and 5' in the same transducer tube 1 will produce in the output circuit 2'—4' direct-current voltages measuring the direction and magnitude of horizontal displacement 113 of the normally horizontally centered tube 1 between the plane vertically disposed external horizontal-field-producing auxiliary electrodes 81' and 83', also energized from the generator 17, or if desired, from a separate generator. Displacements or motions of the tube 1 in two dimensions are thus selectively indicated. It is to be understood, of course, that, if desired, one of the electrodes may serve as both a horizontal and a vertical electrode, in which case only three electrodes would be necessary instead of two pairs of electrodes. In the same manner, a third pair of electrodes, not shown for purposes of simplicity, extending in a direction parallel to the plane of the drawings may be used to indicate displacements in the third dimension out of the plane of the drawings between a similar pair of plane external auxiliary electrodes, also not shown in order not to complicate the drawings, disposed in planes parallel to the plane of the drawings. Displacements or motions in any direction or coordinate may thus be independently indicated. The fields between the external auxiliary electrodes 81, 83, 81', 83', etc., may, furthermore, be modified in accordance with any desired law as before explained in connection with the systems of Figs. 17 and 18, and they may be of any desired configuration. If, as a further illustration, the generator 17 feeds radio-frequency energy to the electrodes 81 and 83 in ninety degree phase relationship with the energy fed the electrodes 81' and 83', a circular field pattern may be established in which the tube 1 may be moved or displaced. Other phase, amplitude and frequency relationships between the fields set up between the various pairs of external electrodes may, of course, also be employed as is well-known in the art. In the systems of Figs. 9, 17, 18 and 19 above discussed, and also in the system of Fig. 11 hereinafter described, furthermore, it is to be understood that instead of moving the transducer tube between the fixed external field-producing electrodes, the transducer may be fixed and one or more of the external electrodes of each pair of field-producing electrodes may be moved relative to the transducer, thereby to produce the same results.

A system fully equivalent to that of Fig. 9 in which the tube 1 may also remain stationary is illustrated in Fig. 10. Condensers $C_1$ and $C_2$ are shown respectively replacing the capacitance between the principal electrode 3 and the auxiliary electrode 83 and between the principal electrode 5 and the auxiliary electrode 81, the condensers $C_1$ and $C_2$ serving, also, as the auxiliary electrode means. By varying or vibrating the condensers $C_1$ and $C_2$, the same effects above-described in connection with movement of the tube 1 may be produced. The condensers $C_1$ and $C_2$ may also be replaced, of course, by any other impedance elements.

Enough has already been shown of the many similar and equivalent arrangements that the transducers of the present invention may take to establish that whatever movement of the tube or of the tube electrodes will do in particular forms of the invention, movement of a capacitor or other impedance element or of field-producing-elements will do in other forms. All of the forms of the invention are interchangeable and a showing of one form operating in a particular manner or with a particular device is to be understood as only for purposes of illustration, since every other form of the invention may be similarly operated in the same manner or with the same device.

If a circuit resonant to the frequency of the oscillator or generator 17 is connected in the output circuit 2—4, very desirable results are obtainable. The resonant circuit, it is to be understood, may be employed in the output circuit of any of the embodiments of the invention, but for convenience it is illustrated in Fig. 11 as applied in the output circuit 2—4 of the system of Fig. 9. The resonant circuit is shown comprising a parallel-connected condenser C' and inductance L shunted across the output terminals 2—4. A condenser 89 is placed in series with the inductance L to prevent a short circuit of the direct-current output voltage resulting, in accordance with the present invention, between the electrodes 3 and 5 in the output circuit 2—4. Either the condenser C' or the inductance L, or both, may be tunable, though, for illustrative purposes, only the condenser C' is shown variable. If the resonant L—C' circuit of any desired form, such as lumped circuit elements, a piezoelectric crystal circuit or a cavity resonator, is tuned to the frequency of the generator 17, a radio-frequency voltage, for example, will arise between the principal electrodes 3 and 5 that is dependent not only upon the capacitance between the principal electrode 3 and the auxiliary electrode 83 and between the principal electrode 5 and the auxiliary electrode 81, but also upon the electrical characteristics of the L—C' tuned circuit. Varying the tuning of the L—C' circuit above and below resonance to the frequency of the generator 17 changes not only the magnitude of voltage between the principal electrodes 3 and 5 but also the phase of the voltage with respect to the voltage between the external electrodes 81 and 83. This variation of phase, furthermore, further varies the field strength in the vicinity of the principal electrodes 3 and 5, thereby influencing the magnitude and polarity of the direct-current voltage arising in the output circuit 2—4.

The graph of Fig. 12 illustrates an experimentally obtained curve relating the direct-current output voltage V as a function of the tuning of the condenser C' in the L—C' circuit. As C' is tuned to cause the L—C' circuit to approach resonance with the frequency of the generator 17, the voltage V rises as shown at 91. Closer to resonance, the output voltage falls sharply, as at 93, passing through zero at the resonant point 95, and reversing polarity to increase sharply negative, as at 97, below resonance. Further variation of C' to tune the L—C' circuit further below resonance results in a more gradual decrease 99 in negative output voltage.

The use of a resonance circuit in the output circuit of any of the embodiments of the present invention, therefore, provides for the developing of a direct-current output voltage that depends both upon the adjustment of the transducer circuit itself, such as the displacement of the electrode 9 in Fig. 1, or the variation of the capacitor $C_1$ of Fig. 7, or the relative positioning of the tube and the external field-producing auxiliary electrodes of Fig. 9, and the tuning of the output resonance circuit. Either the adjustment of the transducer circuit or the tuning of the output resonance circuit, or both, may be used for position-indication measurement, control purposes, or for any of the various applications of the present invention. Of particular interest, for example, is the use of such a system for resonance indication. Present-day voltage or current resonance indicators respond to the relatively flat resonance response of tuned circuits. The present invention, on the other hand, at resonance, passes sharply through zero output voltage V, as shown at 95, permitting very accurate resonance measurements. The fact, moreover, that the response shown in Fig. 12 passes through zero at the resonant point 95 and produces positive increasing voltages 93 on one side of resonance, and negative increasing voltages 97 on the other side of resonance, adapts the system to such applications as frequency or phase control, discrimination or measurement. The voltage V in the output circuit 2—4 of Fig. 11, as an illustration, may be fed directly to a velocity-modulated oscillator, such as a klystron, automatically to control its frequency, or to a conventional reactance tube, in the manner illustrated in Fig. 24, for example, to keep the center frequency of frequency-modulated transmissions constant, as is well known in the art. The use of this circuit provides, as still another illustration, a direct measurement of phase angle because of the characteristic of Fig. 12.

The output-circuit tuned circuit L—C' may also be tuned to the frequency of any modulation envelope of the radio-frequency or other carrier energy of the generator 17, as previously discussed in connection with the systems of Figs. 4 and 5, or it may be tuned to the relative vibrational or oscillatory frequency of the tube 1 and external field auxiliary electrodes as discussed in connection with the embodiment of Fig. 9, or to the relative vibrational or oscillating frequency of the ring auxiliary electrode 9 and the principal tube electrodes of Fig. 1, or the frequency of movement of the condenser $C_1$ or $C_2$ of Fig. 7, and so on.

Figure 13:
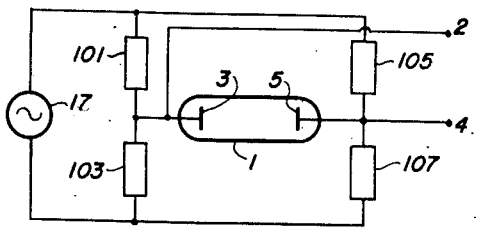

Before commencing detailed treatment of specific applications of the transducer circuits of the present invention, it is desirable to mention several other illustrative forms that the invention may take. In Fig. 13, for example, a tube 1 having principal electrodes 3 and 5 is operated in a manner similar to that discussed in connection with the embodiments of Fig. 10 with the aid of a plurality of impedance elements arranged in the form of a bridge. This circuit is of the ungrounded type. Impedance elements 101 and 103 are shown connected in series with the generator 17. Two further series-connected impedance elements 105 and 107 are connected in parallel with the elements 101 and 103. These impedance elements, like the condensers $C_1$ and $C_2$ of Fig. 10, also serve the function of auxiliary electrode means. The principal electrode 3 of the tube 1 is connected to the junction between the series-connected elements 101 and 103, and the principal electrode 5 is connected to the junction of the impedance elements 105 and 107. The potential or field strength of the electrode 3, with respect to some reference, perhaps ground, is determined by the ratio of the impedances of the impedance elements 101 and 103, while the potential of the electrode 5 is determined by the ratio of the impedances of the impedance elements 105 and 107. Differential potential gradients may thus be set up by adjusting the respective ratios of the impedances, producing effects in the output circuit 2—4 of the same character as those obtained when the tube 1 of Fig. 9 is moved between the auxiliary electrodes 81 and 83, or when the condensers $C_1$ or $C_2$ of the tube 1 of Fig. 10 are varied, or when the variable elements of any of the other embodiments of the invention are adjusted.

Figure 16:
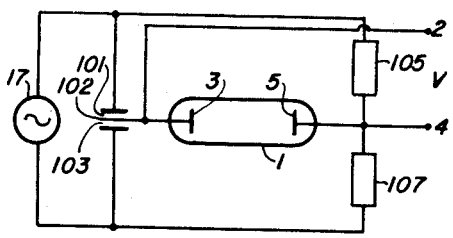

As a specific illustration, a double capacitor is shown in Fig. 16, such as a condenser microphone or a pressure device of the type hereinafter discussed in connection with Figs. 27 or 46. The capacitance between a center, movable condenser plate 102 and the top condenser plate is the impedance element 101, while the capacitance between the center condenser plate 102 and the bottom condenser plate is the impedance element 103. With the center plate 102 half-way between the upper and lower condenser plates, the impedances 101 and 103 are equal. Movement of the center plate 102 toward, for example, the upper condenser plate, increases the capacitance of impedance element 101, correspondingly decreasing the capacitance of impedance element 103. Impedance elements 105 and 107 may, as an illustration, be capacitances each of value equal to the original values of impedance elements 101 and 103, so that the unbalance of the elements 101 and 103 produces a field strength differential between the principal electrodes 3 and 5 resulting in a direct-current output voltage V in the output circuit 2—4, of the character previously described.

Figure 14:
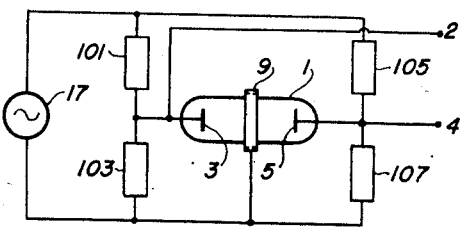
Figure 15:
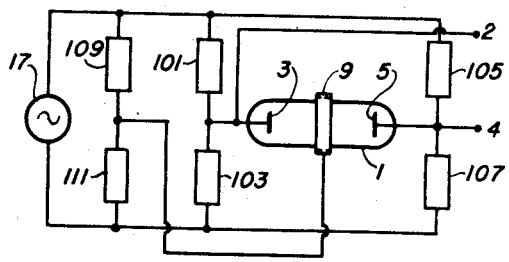

The modification of Fig. 14 differs from the circuits of Figs. 13 and 16 only in the particular that an external ring electrode 9 is also employed connected to the junction between impedance elements 103 and 107 at a point of different potential than the principal electrodes 3 and 5. This system may therefore by symmetrically or unsymmetrically grounded, or not grounded at all. Variations of the impedance elements 101, 103 and 105, 107, serving the function of an auxiliary electrode means, as before stated, and/or movement of the further auxiliary electrode 9 will produce output voltages as before described. Instead of connecting the external electrode 9 to the junction between the impedance elements 103 and 107 as in the system of Fig. 14, moreover, the electrode 9 may be connected to any other point such as the junction between series-connected voltage-dividing impedance elements 109 and 111, shown connected in shunt with the elements 101, 103 in Fig. 15.

The bridge circuits of Figs. 13 to 16, in the same manner as discussed before in connection with the equivalent basic bridge circuit of Fig. 7, may also be used, among other purposes, for measurement of the value of any of the impedance elements themselves or of changes in the values thereof. In the circuit of Fig. 13, for example, the value of an unknown impedance element 101 may quickly be determined by employing equal impedance elements 103, 105 and 107 and merely measuring the value of the properly calibrated direct-current voltage V in the output circuit 2—4.

The transducers of the present invention lend themselves also to circuits for measuring differential effects such as, for example, the difference between two movements. More generally, the present invention provides a novel system for algebraic addition. Algebraic adding embraces the addition of positive quantities, the addition of negative quantities and the addition of positive and negative quantities, often called subtraction. In the embodiment of Fig. 20, as an illustration, identical gas-discharge tubes 1 and 121 are shown each provided with respective principal electrodes 3, 5 and 123, 125; and each provided with an external ring electrode 9 and 129. A common alternating-current source or generator 17 is shown providing energy to the two tubes 1 and 121 by means of the same type of circuits previously described in connection with the embodiment of Fig. 1. The principal electrodes 5 and 125 of the respective tubes 1 and 121 are connected together to one terminal of the generator 17. The other terminal of the generator 17 is connected to the movable electrodes 9 and 129. The electrodes 3 and 5 are coupled by a condenser 117 and the electrodes 125 and 123 are coupled by a condenser 119. Between the principal electrode 3 of the tube 1 and the principal electrode 123 of the tube 121, is connected an output circuit 2—4 embodying, as an illustration, the meter M. A direct-current potential may arise, as before explained, between the principal electrodes 3 and 5, the magnitude and polarity of which depend upon the direction and amount of displacement of the ring electrode 9 from the center of the tube 1. Similarly, a direct-current voltage may be produced between the principal electrodes 123 and 125 of polarity and magnitude dependent upon the direction and amount of movement of the ring electrode 129 from the center of the tube 121. If the ring electrode 9, for example, is moved in the direction of the arrow placed adjacent thereto, the electrode 5 will become negative with respect to the electrode 3. Similarly, if the ring electrode 129 is moved in the same direction toward the electrode 123, as indicated by the arrow adjacent thereto, the electrode 125 will become negative with respect to the electrode 123. Since the electrodes 5 and 125 are at a common potential, being connected together as before described, a voltage arises between the principal electrodes 3 and 123 that is dependent upon the difference of position of the ring electrodes 9 and 129 from the respective centers of their respective tubes 1 and 121. The circuit of Fig. 20, furthermore, is remarkably free of interacting influences between the tubes 1 and 121.

If, for example, both ring electrodes 9 and 129 are moved in the same direction the same amount toward the respective principal electrodes 3 and 123, the voltage appearing across the meter M, which, as before described, is connected between the electrodes 3 and 123 in the output circuit 2—4, will be zero. If, on the other hand, the auxiliary ring electrodes 9 and 129 are not equally displaced from their respective tube centers, and if the tubes 1 and 121 are operated over their substantially linear characteristics, the output voltage across the meter M will be proportional to the difference in the displacements of the electrodes 9 and 129. It is to be understood, of course, that the circuit of Fig. 20 is equally adaptable to measure angular as well as linear position differences, as when, for example, the ring electrodes 9 and 129 are moved in response to angular displacements, such as those discussed in connection with the embodiment of Fig. 3.

While the tubes 1 and 121 have been shown connected to the same source 17, it is also to be understood that the tubes may equally well be energized by separate generators, as when they must be operated at remote points. An application of such a circuit arises, for example, in remote-control operations where it is desired to have two movements or displacements maintained in synchronism. By the expedient of the circuit of Fig. 20, displacements at one ring electrode will produce in the indicator M, a voltage indicating the difference between the position of the displaced ring electrode and the position of the other ring electrode. Upon movement of the other electrode to the point where the meter M or other device registers a null, the two ring electrodes 9 and 129 will then be in corresponding positions on their respective tubes 1 and 121.

If the electrodes 9 and 129 are not moved in the same direction relative to the centers of their respective tubes, but, on the contrary, are moved in opposite directions, a voltage will be produced in the meter M proportional to, or otherwise representative of, the sum of the displacements of electrodes 9 and 129 from the centers of their respective tubes 1 and 121. It is to be understood, moreover, that the preferably high impedance meter M may, of course, be replaced by any well-known follow-up circuit, as later described in connection with the embodiments of Figs. 34 to 36 to produce voltages that may be used mechanically to move the ring electrodes into corresponding positions on their respective tubes.

It will be observed that the circuit of Fig. 20 may be considered as a series circuit, in which the tubes 1 and 121 aid or buck each other in series with the meter or other indicator M. The present invention is not by any means, however, limited to series-connected transducer circuits. In the embodiment of Fig. 21, as an illustration, two tubes 1 and 121 are shown connected in parallel. These tubes are operated as transducers in accordance with the principles previously discussed in connection with the embodiment of Fig. 10, in accordance with which a center auxiliary ring electrode need not be employed, but differences in potential gradients between the respective principal electrodes 3, 5 and 123, 125 may be produced by variable impedance elements, such as the variable capacitors 131 and 133, shown respectively connecting the principal electrodes 5 and 125 to one terminal of the generator 17 and acting, also, as auxiliary electrode means. The other terminal of the source 17 is connected to both the principal electrodes 3 and 123 of the respective tubes 1 and 121. The respective principal electrodes 5 and 125, moreover, are shown each connected through respective similar isolating resistors 135 and 137 to one side of a meter or other indicator M, and the principal electrodes 3 and 123 are shown connected to the other terminal of the meter or the other indicating circuit M. It may be shown that, where two voltage sources, such as the tubes 1 and 121, are connected in parallel through identical isolating impedances, such as the resistors 135 and 137, the voltage resulting in an output circuit shunting the sources of voltage, such as the circuit 2—4, is proportional to the sum of the voltages of the two voltage sources. The isolating resistances 135 and 137 are preferably of high value but the meter M may have any desired impedance. As the condensers 131 and 133 are varied in different amounts in response, for example, to movements that operate upon their condenser plates, as hereinafter discussed, the direct-current voltages produced in accordance with the phenomenon of the present invention across the principal electrodes of the respective tubes 1 and 121 will correspondingly vary, producing in the meter M a voltage which is proportional to the sum of the voltages produced by the two transducer tubes.

The present invention is not limited, furthermore, merely to obtaining the sum or the difference of two quantities such as two mechanical displacements or movements. It may equally well be applied to obtaining the composite sum or difference of any number of different quantities. In the embodiment of Fig. 22, as an illustration, three transducers, 1, 121 and 141, are illustrated, each supplied with respective principal electrodes 3 and 5, 123 and 125, 143 and 145. The tubes 1, 121 and 141 are shown provided with respective movable ring electrodes 9, 129 and 139. All of the ring electrodes are connected in parallel to the lower terminal of the source or generator of radio-frequency or other alternating-current energy 17. The principal electrode 3 of the tube 1 is shown connected through a coupling condenser 147 to the upper terminal of the source 17, and also, through output-circuit conductor 2, to one terminal of an output meter or other indicator or voltage-responsive circuit M. The principal electrodes 5 and 123 of the respective tubes 1 and 121 are shown connected through a common coupling condenser 151 to the upper terminal of the source 17. The principal electrodes 125 and 143 of the respective tubes 121 and 141 are similarly connected through a common coupling condenser 153 to the upper terminal of the generator 17. The principal electrode 145 of the tube 141 is also coupled by a coupling condenser 155 to the same upper terminal and is also connected through output-circuit conductor 4 to the opposite terminal of the meter M from that to which the principal electrode 3 is connected by the conductor 2. In effect, therefore, the three transducers 1, 121 and 141 are connected in series so that the meter or other voltage-responsive circuit M in the output circuit 2—4 will read various combinations of the sum or difference of the displacements of the ring electrodes 9, 129 and 139 from the respective centers of their respective tubes, 1, 121 and 141, depending upon the directions of displacement of the ring electrodes from the respective centers of their respective tubes.

In all of the differential or summation systems above described, it is possible to place the meter or other voltage-responsive circuit M at a point distant from the transducers. The output conductors 2—4 leading to the meter or other voltage-responsive circuit M carry direct-current only, and may, if desired, be by-passed with capacitors, as is well known in the art, so that no pick-up or induction will result along the output leads. The embodiments of Figs. 20 to 22 may thus find convenient application in the remote measurement of various sums or differences of movement or displacement of different loads located at different points of a system. These circuits are useful also as adding or subtracting machines or counters.

As before mentioned, furthermore, the output circuit 2—4 of all the embodiments of the invention may be connected to any type of voltage-responsive circuit and not merely to a meter or indicator. In the system of Fig. 23, as an example, a single transducer 1 is shown, for purposes of illustration, connected with its output terminals 2—4 feeding the electrodes of a radio-frequency transmitter tube 157. The displacement of the ring electrode 9 produces voltages that result in varying the bias on the transmitter electrodes, thereby to amplitude-modulate the transmitter. If the transmitter 157 comprises a reactance tube, the voltage from the transducer may be fed thereto to vary the frequency or phase of the transmitter 157, as later discussed in connection with Fig. 24, so that there will be transmitted from the antenna 159, radio-frequency transmissions modulated by the voltages produced by the transducer of the present invention. These signals may be picked up in a receiving antenna 161, and demodulated in a receiver 163 for presentation in, for example, a meter or other indicator M.

While a separate generator 17 is shown provided for energizing the transducer 1, the radio-frequency transmitter 157 may be used to excite the transducer as well as to provide radio-frequency energy for transmission into space. As illustrated in the embodiment of Fig. 24, a common radio-frequency generator or source 17, accordingly, is shown feeding radio-frequency energy to excite the transducer 1 and to energize a resonant or tank circuit consisting of, for example, a parallel-connected condenser 165 and inductance 167. The resonant circuit 165—167 may, of course, comprise any radio-frequency tuned circuit such as, for example, a resonant transmission line, or a cavity resonator. The energy in the tuned circuit 165—167 may be modulated, as previously described in connection with Fig. 23, in response to the direct-current output voltage of the transducer 1. The tuned circuit 165—167 is shown coupled to the antenna 159 through an energizing coil 169. The ring electrode 9 may be positioned in approximately the center of the tube 1 and connected to some point in the output energizing coil 169. The principal electrode 5 is shown connected to the grounded terminal of the source of radio-frequency energy 17, and the other principal electrode 3 is illustrated connected through a variable condenser C to a modulating device such as, for example, a reactance tube 171. The reactance tube may be connected to the tuned circuit 165—167 in conventional manner to vary the frequency of the radio waves coupled into the antenna 159. As the condenser C is varied in response to any desired force to produce an output voltage between the principal electrodes 3 and 5 in the output circuit 2—4, thereby to vary the impedance of the reactance tube 171 and correspondingly to effect the tuning of the circuit 165—167, radio waves are transmitted that are frequency-modulated in accordance with the amount of variation of the condenser C. As before mentioned in connection with the embodiment of Fig. 23, the output voltage from the transducer 1 may equally well phase- or amplitude-modulate the transmitter. By operating these systems over particular ranges previously discussed in detail, where the operation of the tube 1 is independent of variations in frequency or amplitude of the generator 17, though the frequency or amplitude of the radio waves varies in response to the modulating voltages produced by the transducer 1, as illustrated in Figs. 23 and 24, the operation of the tube 1 may not be affected.

The embodiments of Figs. 23 and 24 illustrate in their broad form, therefore, that all of the systems heretofore discussed and hereinafter treated are adaptable for modulating radio-frequency transmitters to transmit signals containing information concerning the forces acting upon the transducers of the present invention. Such circuits are particularly useful for telemetering, where movement of, for example, the transducer ring electrode, or variations of the impedance elements or other variable elements of the transducer circuits previously and hereinafter discussed, may be effected in response to such forces as atmospheric pressure, wind velocity, temperature, humidity, and the like, as later more fully discussed. The information resulting from the action of these forces upon the transducer of the present invention may thus be received and detected at a remote station in the receiver, 163, Fig. 23.

Transducers operating under the control of such forces are illustrated in Figs. 25 to 30 and 47. The circuits of Figs. 25 and 26 illustrate changes in temperature effecting controlling influences upon the transducer of the present invention. In Fig. 25, the transducer 1 is shown energized from a generator 17 in the manner discussed in connection with the embodiment of Fig. 7. In place of the conventional condenser or other impedance element $C_1$, however, two spaced electrodes 171 and 173 are shown coupling the principal electrode 3 to one side of the generator 17. From the same side of the generator 17 a balancing condenser $C_2$ connects to the principal electrode 5. The other terminal of the generator 17 connects to the ring electrode 9, which, in this particular case, may be fixed. In between the spaced electrodes 171 and 173, is a temperature-indicating device such as, for example, a mercury-filled thermometer 175. As the mercury or other temperature responsive liquid in the thermometer 175 rises and falls in response to temperature variations, therefore, more or less liquid is present between the electrodes 171 and 173, thereby changing the capacitance $C_1$ and producing a corresponding direct-current signal in the output circuit 2—4, as before discussed.

In the embodiment of Fig. 26, a similar tube 1 is shown connected in the same type of circuit. The ring electrode 9 may be movable, however, in response to a bi-metal relay or similar temperature-responsive strip 177. As the bi-metal relay or other device 177 bends in response to changes in temperature, it moves the ring electrode 9 to produce a corresponding direct-current voltage indication in, for example, the meter M in the output circuit 2—4.

As still another example of the type of control circuit that may operate upon the transducer of the present invention, a pressure or altitude device is indicated in Fig. 27. The previously discussed system of Fig. 45 may be used for this purpose also, outside pressure acting upon the bellows 11 in opposition to the gas pressure within the tube 1. The principal electrodes 3 and 5 of the gas-discharge tube 1 of the system of Fig. 27, however, are shown connected to spaced electrodes 181 and 183 that cooperate with a thin central conducting membrane or electrode 185, connected to one terminal of the generator 17. The other terminal of the generator connects with the ring electrode 9, which may, in this case, be fixed. The center electrode 185 serves as a common condenser plate for electrodes 181 and 183 and also divides a chamber into an upper portion 179 and a lower portion 187. The leads from the electrodes 3 and 5 are shown passing through sealed insulators in the right-hand walls of the upper and lower chamber portions 179 and 187. The upper chamber portion 179 is provided with an inlet or outlet 189, and the lower chamber 187 is provided with an inlet or outlet 191. If one of these chambers such as, for example, the chamber 187 is evacuated, and the corresponding inlet 191 is sealed, as is well-known in the art, then variations in atmospheric pressure resulting from the action of air passing through the inlet 189 into the upper chamber 179 and acting upon the member 185, will result in movement of the membrane member 185, resulting in direct-current indicating voltages in the output circuit 2—4. If a meter M, for example, is connected in the output circuit, variations in barometric pressure caused, for example, by altitude, may be indicated. We have, as another illustration, employed the circuit of Fig. 27 as a plesythmograph and have found that the pulsating blood pressure of a human finger inserted in, for example, the inlet 189 produced corresponding voltage indications in the meter M. With a tape recorder substituted for the meter, we have recorded the pressure cycle of the blood stream. As still another illustration, if a conventional Pitot tube is employed, as on an aircraft, with the in-rushing air stream fed to, for example, the inlet 189 and the quiescent air to the inlet 191, the velocity of the aircraft or of the air stream may be measured on the meter M.

Another type of device that may be employed to control the transducer of the present invention is illustrated in Fig. 28. A metallic or other conductive indicator, needle or arm 193 of a meter, clock, scale, counting device, or other registering device 195 is caused to rotate past the wire electrodes 3 and 5 of the transducer 1. The electrode 5 is energized from one terminal of, for example, the radio-frequency generator 17 and the needle or indicator 193 is connected to the other terminal to act in a similar fashion to the external movable ring electrodes previously discussed. Electrodes 3 and 5 are coupled by a capacitor C. In the output circuit 2-4, therefore, there will result a direct-current voltage each time the pointer 193 moves into the vicinity of the gas tube 1, producing assymmetry of field strength. The circuit of Fig. 28 is thus adapted to producing counting voltage impulses or voltages that measure the position of the indicator 193.

Another force that may be measured in accordance with the present invention, as also discussed in the said copending application, is acceleration. A circuit is illustrated in Fig. 29 in which the gas tube or other transducer 1 is connected to a circuit of the type discussed in connection with the embodiment of Fig. 7. The condensers $C_1$ and $C_2$, however, are operated in response to acceleration or other forces as will now be explained. The principal electrode 3 is connected through a lower and a relatively movable upper condenser plate of the condenser $C_1$ to a conducting arm 197 that may be centrally pivoted about a shaft 199 that connects to one terminal of the source or generator 17. The other principal electrode 5 is connected through lower and relatively movable upper condenser plates of the condenser $C_2$ to the other end of the arm 197. The arm 197 may be spring mounted, as by springs 101, connected to a wall 103. As the arm 197 pivots about the shaft 199 in response to angular acceleration or other forces, the upper condenser plates of the condensers $C_1$ and $C_2$ are oppositely moved toward or away from their respective lower condenser plates, thereby changing the relative magnitudes of condensers $C_1$ and $C_2$ and accordingly varying the field strength at the principal electrodes 3 and 5. The result in the output circuit 2—4 is a direct-current voltage that may be indicated, recorded, or otherwise used for measurement or control as is well known in the art.

As still another application of the present invention, reference is made to the system of Fig. 30 the electrical connections of which are substantially identical with those previously discussed in connection with the system of Fig. 25. The spaced electrodes 171 and 173, however, are in this case shown open to produce a considerable stray field of radio-frequency energy. If an object 175, for example, is brought within this stray field, a variation in capacitance between the electrodes 171 and 173 will result, thereby producing variations in the potential gradients within the tube 1 and a corresponding output direct-current voltage in the output circuit 2—4. The arrangement of Fig. 30 is thus particularly sensitive for object-detection or counting, for dielectric measurements, for the inspection of metallic particles in sealed packages, for mine detection, and similar applications. It should also be mentioned that, should there be provided between the electrodes 171 and 173 of the systems, for example, of Figs. 25 and 30, hygroscopic material such as silica gel which absorbs moisture and thereby alters its dielectric constant, the output of the transducer will give information regarding the relative humidity of the atmosphere affecting the hygroscopic material.

Still another application of the present invention is illustrated in Fig. 47 in which the transducer 1 operates as a strain gauge or linear accelerometer. The circuit is very similar to that of Fig. 27, employing condenser plates 181 and 183 respectively connected to the principal electrodes 5 and 3 that cooperate with a common movable central electrode 185. The common electrode 185 may be moved up and down in accordance with a weight or other force 241 acting upon a member 243 that is spring mounted, as illustrated at 245, to a fixed member 247. The voltage in the output circuit 2—4 will measure the weight or other forces acting upon the member 243 in opposition to the springs 245.

Again reference is made to the fact that the systems of Figs. 25 to 30, 45 and 47, as well as the other embodiments of the invention, may be used in conjunction with radio transmitters, as illustrated in Figs. 23 and 24, for telemetering measurements or other remote transmissions in order to permit the reception of voltage signals that measure particular forces, quantities or movements.

In addition to the facility of the transducer of the present invention in measuring circuits, the present invention provides also a unique pick-off for producing voltages that may be fed to error circuits, including servo-mechanisms. In the embodiment of Fig. 31, as an illustration, three separate transducers 1, 121 and 141 are shown each connected in identical circuits of the character previously discussed in connection with the embodiment of Fig. 7. The ring electrodes 9, 129 and 139 of the respective tubes 1, 121 and 141 are shown connected to one terminal of each of three identical generators such as radio-frequency oscillators 17, all given the same reference number since they may, if desired be the same source. The other terminals of the generators 17 are connected through similar variable condensers $C_1$ and $C_2$ to the respective principal electrodes of the tubes, as before discussed. The output circuit 2—4 of each transducer is connected to a control amplifier that operates an associated motor for regulating the angular position of some air-foil member, such as a rudder, an elevator, or an aileron of an aircraft or projectile. While this embodiment is illustrated as applied to aircraft air-foil members, it is to be understood that it is of more general use being equally adapted to control angular, linear or other movement of any desired member. The output circuit 2—4 of the transducer 1 is shown connected to a control amplifier that operates a motor for regulating the position of an aircraft rudder. The transducer 121 similarly produces voltages for controlling the position of elevators, while the transducer 141 operates through a control amplifier and motor to regulate the adjustment of ailerons. Aircraft are customarily stabilized by means of well-known gyroscope-control circuits. These gyroscopes produce movements which are customarily used to re-adjust rudders, elevators, and ailerons in order to stabilize the flight of the aircraft. Such a conventional gyroscope system is illustrated at 105. It is more fully discussed hereinafter in connection with the systems of Figs. 40 to 43. The condenser $C_1$ of each of the transducer circuits is shown connected by a dotted line to a corresponding portion of the gyroscope system to illustrate mechanical ganging thereto as later fully treated in the discussion of Figs. 40 to 43. The opposite condensers $C_2$ of each transducer are each similarly shown mechanically ganged to the conventional corresponding pilot's controls 107. As the pilot moves his rudder, elevator and aileron controls, he thus automatically correspondingly varies the values of the responsive condensers $C_2$. This results in unbalancing the potential gradients in the respective transducers and producing corresponding direct-current voltages that, through the respective control amplifiers, operate the respective motors to vary the position of the rudder, elevators and ailerons in response to the pilot's settings on his controls 107. The aircraft thus varies its flight position in accordance with these adjustments. The gyroscope system 105, however, responds to the variations in flight and, in so doing, correspondingly automatically varies the values of the respective condensers $C_1$ in each transducer circuit. When the gyroscope position and the actual intended flight position of the aircraft are in accord, the settings of the condensers $C_1$ of each circuit will correspond to the settings of the condensers $C_2$, and no further correction voltage output will result from the transducers, the rudder, elevator and ailerons being in their desired positions.

Still another type of control circuit is illustrated in Fig. 32 in which the transducer 1 is provided with a variable capacitor $C_1$ connected between the principal electrode 3 and one of the terminals of the generator 17. The left-hand plate of this condenser $C_1$ is shown movable toward or away from the right-hand plate in response to energizing voltages in an electromagnetic device 109. Extremely small movements or displacements of the electromagnetic device 109 may produce in the transducer of the present invention appreciable voltage responses. The present invention, therefore, may be adapted to act as an amplifier of very small mechanical displacements. The output circuit 2—4 of the tube 1 is shown connected across, for example, a meter M. A potentiometer, the slider of which is shown at 111, may be connected between the output terminals 2 and 4 and may tap off part of the output voltage appearing in the output circuit 2—4, in order to feed back to the coil of the electromagnetic device 109. If, therefore, a small input voltage appears at the input circuit 112—114 of the electromagnetic device 109, the left-hand plate of the condenser $C_1$ will be moved a small amount in response thereto. Since no restoring force is present in this system, the left-hand condenser plate of the condenser $C_1$ will continue movement until it reaches its end position, or until the input voltage in the input circuit 112—114 is interrupted, or until a voltage of opposite polarity is applied to the input circuit 112—114. Variations in the condenser $C_1$ produced by this movement will also, as previously discussed, produce corresponding direct-current voltages in the output circuit 2—4 of the transducer 1, which, because of the sensitivity of the tubes of the present invention, may be many times larger than the original voltage fed into the input circuit 112—114 of the electromagnetic device 109. This output voltage may be measured in any desired way as, for example, upon the meter M. As before mentioned, however, part of this output voltage is fed back by the potentiometer slider 111 to the input circuits 112—114 of the electromagnetic device 109 in opposite polarity to the original input voltage. When the feedback voltage has obtained a value equal to the original small input voltage to the electromagnetic device, the electromagnetic system 109 will stop further movement, stopping further displacement of the left-hand condenser plate of the condenser $C_1$, and the meter M will then indicate a greatly amplified voltage corresponding to the original small input voltage. While systems of this type have previously been used with other types of transducers, the present invention has particular merit because of its low inertia and because of the high output direct-current voltage resulting therefrom. It is to be understood, of course, that, as in the other embodiments of the invention, the meter M may be replaced by a motor, a recorder, a voltage control circuit, or any other desired circuit or device.

Still another application of the present invention to a control circuit is illustrated in Fig. 33, in which flexible conductive feeler-gauge strips 113 and 115 are positioned so as to contact objects 117, such as cylindrical devices, moving past them on a conveyor belt 119. The feeler-gauge strip 115 is shown connected to a taut wire 123 secured at its end 121, and held under tension by a spring 125. The feeler 115 is also connected by a wire element 127 to the external ring electrode 9 of the tube 1. The tube 1 is energized by a generator 17 in the same fashion as discussed in connection with the embodiment of Fig. 1. A direct-current voltage will appear in the output circuit 2—4 every time that an object 117 of greater or less size, such as greater or less diameter, than a predetermined size, pushes the tensioned feeler 115, thereby correspondingly displacing the center eelctrode 9. The resulting direct-current voltage will have a magnitude and polarity related to the off-size of the object, and may be amplified in an amplifier 129 to provide voltages for either stopping the motion of the conveyer belt 119 or operating an ejector to eject the off-sized object 117, as is well-known in the art.

Instead of the particular feeler gauge of Fig. 33, other types of gauges or followers may be used. The system of Fig. 46, for example, employs a prod or needle 233. This system is adaptable for measuring the thickness of materials or irregularities of surfaces, as well as for acting as a phonograph pick-up as discussed in the said copending application. The transducer 1, is shown connected in a circuit very much like that previously described in connection with the embodiment of Fig. 27. The principal electrode 5 is connected to a condenser plate 181 and the principal electrode 3 is connected to a condenser plate 183, both the plates 181 and 183 cooperating with a common electrode 185 that is connected to one terminal of the generator 17. The other terminal of the generator 17 connects to the ring electrode 9. The electrodes 181, 183 and 185 may be enclosed in a housing 231, which may, if desired, be evacuated, or filled with any desired gaseous medium. The common electrode 185 may extend through one end of the housing as at 235, and may be connected to a receiver barrel 234 for carrying the prod or needle 233. The unit comprising the common electrode 185 and the prod 233 may be pivoted at the point 235 in any desired manner, as by means of a rubber gasket at the point 235, not shown. When the needle or prod 233 is moved over a surface such as the surface 237, as it strikes irregularities or grooves in the surface, it causes the unit 185—234—233 to pivot about the point 235, moving the common electrode 185 closer to or further from one of the condenser plates 181 or 183 and thereby producing corresponding direct-current output voltages in the output circuit 2—4 of appropriate polarity and magnitude. These voltages may, if desired, be amplified in an amplifier 239 and fed to any registering or indicating or voltage-responsive device. The system of Fig. 46 is, therefore, adaptable for such uses as phonograph pick-ups or devices for measuring irregularities in surfaces or variations in the thickness of materials, as before stated. In addition to greater sensitivity, moreover, the present invention has other advantages over present-day devices of this character such as magnetic pick-ups. Present-day magnetic devices will register a null on each plane surface that the device is carried over. In accordance with the embodiments of Figs. 33 and 46, however, if the needle or prod or gauge rides upon a plane surface of different level, there will be a corresponding constant direct-current output voltage level in the output-circuit 2—4 that will remain there so long as the device is carried over this new plane, and variations in flatness or other irregularities of the plane surface will be indicated about this constant value. The present invention, therefore, not only measures surface irregularities, but measures them with relation to any desired fixed reference level and is adapted to differentiate between plane surfaces of different thicknesses or levels.

In Figs. 34 to 38, applications of transducers of the present invention to servo-mechanism control systems are illustrated. The transducer 1 of Fig. 34 serves as the pick-off and control device for any desired servo-mechanism system, shown schematically as comprising a load, such as a block 131, connected by, for example, a flexible cable 133 about a pulley system 135, having a movable pulley 139, to a point 137 at which a control may be exercised on the position of the load 131. If it is desired to move the load 131 to the left, for example, the cable 133 may be pulled to the left at the control point 137. The movable pulley 139 of the pulley system 135 will thus be moved upward, carrying with it the ring electrode 9, and producing in the output circuit 2—4 a direct-current voltage proportional to the force applied at the point 137. The output voltage in the output circuit 2—4 is shown fed to a motor or other servo-mechanism follow device 141 for rotating, for example, a gear 143 upon its shaft that may cooperate with a toothed platform 145 upon which the load 131 is placed. In the above illustration, the output voltage will cause the toothed gear 143 of the motor 141 to rotate counterclockwise, thereby moving the platform 145 and the load 131 to the left. The transducer 1 has, therefore, served as a pick-off in this servo-mechanism system, producing in response to a manual or other setting at the point 137, voltages for controlling a follow mechanism to move the remote load 131 in response to the setting.

There may be, however, electrical as well as mechanical means, such as the flexible cable 133 and the differential pulley system 135—139, for producing this result. As shown, for example, in the embodiment of Fig. 35, the same load 131 is shown upon the platform 145, the position of which may be varied by rotation of the motor 141 through the medium of the cooperating gear 143 on the shaft of the motor 141 and the toothed underside of the platform 145. One terminal of the generator 17 is shown connected to an electrode 147. Two separate electrodes 149 and 151 cooperate in capacitive relationship with a common surface of the electrode 147. The electrode 149 is rigidly connected to the load 131 by an element 153, such as a rigid shaft or cable so that movement of the load to the left or right will correspondingly move the capacitive plate 149 to the left or to the right, away from or toward the common electrode 147. The electrode 149 is electrically connected to the principal electrode 5 of the transducer 1. The other principal electrode 3 is connected to the other capacitor plate 151 which, in turn, is rigidly connected by a cable 155 to a manual or other control point 137. A pull to the left on the cable 155 at the point 137 will move the condenser plate 151 away from the common plate 147, and, correspondingly, a push toward the right, will move the condenser plate 151 toward the right. If, then, a force is exerted on the cable 155 at the setting point 137, say to the left, the capacitor electrode 151 is pulled farther away from the plate 147 than the capacitor electrode 149, resulting in electric-field unbalance and the production of a corresponding proper polarity direct-current output voltage in the output circuit 2—4. This output voltage causes the motor 141 to rotate counterclockwise, moving the platform 145 and its load 131 to the left. Such movement, however, also moves the shaft 153 and hence the capacitor plate 149 to the left until it is once again spaced from the common electrode 147 the same distance as the capacitor plate 151 is spaced therefrom, at which time there is again electrical symmetry in the transducer 1 and zero output voltage in the output circuit 2—4. The differential capacitor system 147—149—151 of Fig. 35, therefore, is an electrical analogue of the mechanical differential pulley system 135—139 of Fig. 34.

It is, of course, to be understood that any of the transducer systems previously discussed, including the multiple transducer arrangements, may similarly be applied to servo-mechanism systems. As an illustration of a multiple-tube arrangement, for example, two transducers 1 and 121 are shown in Fig. 36 each provided with corresponding principal electrodes 3, 5 and 123, 125, and movable external ring electrodes 9 and 129. The circuit connections of each transducer are those previously described in connection with Fig. 6. From the manual or other control point 137, a rigid element 155 may be moved correspondingly to move the ring electrode 9 of the transducer 1. The principal electrode 5 of the transducer 1 is directly connected to the principal electrode 125 of the transducer 121. The other principal electrode 3 of the tube 1 connects through conductor 2 to one terminal of the motor 141 and the other principal electrode 123 of the tube 121 connects through a conductor 6 to the other terminal of the motor 141, so that, in effect, the tubes 1 and 121 are connected in series. The transducer 1 may, for example, be at a remote point from the rest of the system, and this possibility is indicated by the vertical dotted line separating the devices 1 and 121. Movement of the ring electrode 9, however, in response to the manual or other control at the point 137, produces in the output circuit 2—4 a direct-current voltage that, as before mentioned in connection with the systems of Figs. 20 to 22, is in series with any resulting output voltage appearing across the electrodes 123—125 of the other tube 121. Any voltage output of the second transducer 121, however, is controlled by the position of the load 131 by means of a mechanical connection 135 between the load platform 145 and the ring electrode 129 of the tube 121. The motor 141 is energized, therefore, by the resultant voltage of the output voltages produced by both transducers. If, for example, the ring electrodes are initially at the centers of their respective tubes, and the ring electrode 9 of the tube 1 is displaced at the remote control point 137 to the left, a resultant voltage equal to the output voltage in the circuit 2—4 will drive the motor 141 counterclockwise so that the load 131 is moved to the left. As the load 131 moves to the left, however, it causes the ring electrode 129 also to move to the left, producing an output voltage between the principal electrodes 123 and 125 that starts to buck the output voltage in the circuit 2—4. The motor 141 thus starts to slow down until the point is reached where both tubes produce equal and opposite voltages, their external electrodes being in corresponding positions. The motor stops, the remote load 131 having been moved to a position corresponding to the desired adjustment of the manual or other control 137. It is to be noted that, in the connections between the transducers 1 and 121, only direct currents flow, or, in the case of modulated generators 17, relatively low-frequency pulsating currents flow, so that difficulties between the remote units, such as those that require high-frequency shielding and the like, do not arise.

If it is not desired to employ remote control and follow units, a common generator 17 for both transducers 1 and 121 may be used, as illustarted in Fig. 37. This figure is essentially identical with Fig. 36 except that a single generator 17 and a single coupling condenser $C_2$ are used, and an amplifier is illustrated in the overall output circuit 2—6 from the principal electrodes 3 and 123 to the motor 141.

Instead of multiple transducer systems, furthermore, systems as discussed in connection with Fig. 19, employing a single transducer with more than two internal electrodes may also be employed with servo-mechanisms. In the system of Fig. 38, as an illustration, the two-dimensional transducer device 1 of Fig. 19 is shown relatively movable with respect to the external auxiliary electrodes 81, 83 and 81', 83'. It is preferable that the external electrodes be mounted upon a platform 159, and that the tube 1 be movable within the external electrodes by either or both of two manual or other controls 137 and 137'. The tube may be pulled or pushed horizontally from point 137 by a connector 136, and it may be vertically moved from point 137' by a connector 136'. The platform 159 to which the external field-producing plates 81, 83 and 81', 83' and the generator 17 may be mounted, is, in turn, movable vertically in response to movement of a platform 161 to which it is attached. While the external electrodes are mounted to move as a unit with the platform 159, the external electrode 83' is also shown movable horizontally with respect to the elecrode 81' through the medium of the rod 157 connected to the platform 145.

If, accordingly, a force is exerted at the point 137 upon the tube 1, moving it horizontally to the left, for example, a voltage results in the output circuit 2'—4', described in connection with the embodiment of Fig. 19, to energize the motor 141 and thereby to move the vertically disposed electrode 83' horizontally to the left toward the electrodes 81' until the tube 1 is again symmetrically disposed horizontally with respect to the electrodes 81' and 83'. If, on the other hand, the tube 1 is moved upward, as by movement at the control point 137', a direct-current voltage will be produced in the output circuit 2—4 that will energize the motor 163 to cause the platform 159 containing the four external electrodes 81, 83, 81', 83', to move upward, thereby establishing vertical symmetry for the tube 1 in the field of the electrodes 81 and 83. It is, of course, possible to employ still a third dimension of movement and control, if desired, but the example of two dimensions is shown for purposes of illustration. It is not, of course, necessary that the tube 1 be moved horizontally, vertically or along any particular coordinate, since movement in any direction is resolvable into horizontal, vertical and a mutually perpendicular coordinate into the plane of the drawings, as discussed in connection with Fig. 19.

While the embodiments of Figs. 34 to 38 have been diagrammatically illustrated in the conventional manner to show, in general form, the application of the present invention to servo-mechanism systems, it is, of course, to be understood that in practice these systems may comprise such devices as synchronously operated motors, remote-control devices and the like. As a specific illustration, the system of Fig. 36 might be used for rotating an antenna on the mast of a ship from a manual or automatic control located at some remote point on the ship. The tube 1 and control point 137, for example, may be at a radar receiver, and the load 131 may actually be an antenna rotating with the shaft of the motor 141 in response to the settings at the control point. Similarly, the load 131 may be a gun rotated by the motor 141, and so on.

A refined circuit for feeding the pick-off voltages produced by the transducer of the present invention to the following devices, such as the motor 141, of the various servo-mechanism systems above-described, is illustrated in Fig. 39. This circuit is similar to that previously discussed in connection with Fig. 5 with the addition of thyratron or similar devices 165 and 167 following the balanced amplifiers 41 and 43. The respective plates and cathodes of the thyratrons 165 and 167 are fed with alternating-current plate potential 65 from an alternating-current generator 169, the frequency of which may be the same as the modulation frequency 29 of the generator 17. If, as previously explained, the ring electrode is displaced or electrical dissymmetry is established by varying the condensers $C_1$ or $C_2$, or in any other way, the amplifier tubes will no longer have outputs of the same magnitude. The output 63 of the tube 41, furthermore, will be in anti-phase with the output of tube 43. Assuming that no phase shift occurs throughout the amplifying system, the voltage 65 from the generator 169 and the modulation voltage 29 of the source 17 will be in phase. Actually, the circuit may operate with phase shifts, but the assumption of a fixed phase relationship is made for purposes of simplicity in explanation. The output voltage 63 thus drives the grid 171 of thyratron 165 positive when the plate is being driven negative, and vice versa, so that the thyratron 165 does not conduct and has no output, as indicated at 66. Since the output of amplifier 43 is of reverse polarity, however, both the grid 173 and the plate of the thyratron 167 are driven positive and negative together, resulting in the pulsating voltage output 68 that is fed to the motor 141. The magnitude of the voltage 68 depends, of course, upon the amount of displacement of the ring electrode or variation of the coupling condensers. If the ring electrode or the condensers are moved in the opposite direction, thyratron 165 will periodically conduct instead of thyratron 167, to produce output pulses in anti-phase to those at 68 in order to drive the motor 141 in the opposite direction.

The present invention is equally adaptable for use with other types of control circuits or devices such as, for example, gyroscopes, previously mentioned in connection with the system of Fig. 31. Various typical gyroscope arrangements are illustrated in Figs. 40 to 43. In Fig. 40, a transducer 1 is shown connected into an electrical circuit of the same nature as previously discussed in connection with the embodiment of Fig. 17. The principal electrode 3 is shown connected to the stator plates 175 of the condenser $C_1$. The condenser rotor plates are illustrated at 177, movable with a shaft 179 that rotates within a bearing support 183. Electrical connection is established from the rotor plates 177 of the condenser $C_1$ through the shaft 179 and the bearing support 183 by means of conductors 79 and 75 to one terminal of the generator 17. The other principal electrode 5 of the tube 1 is similarly connected to the stator plates 185 of the condenser $C_2$. The rotor plates 187 of the condenser $C_2$ are connected through a shaft 189, in-line with the shaft 179, and its bearing support 181 by means of conductors 77 and 75 to the same terminal of the generator 17. The other terminal of the generator 17 is connected by a conductor 73 to the ring electrode 9. The shafts 179 and 189 of the variable condensers $C_1$ and $C_2$ are shown fixed to a gimbal 191 associated with a conventional gyroscope mechanism 193. The gyroscope is shown having one degree of freedom, but this is only for simplicity, since, in actual practice, further degrees of freedom may be employed, such as the three degrees hereinafter discussed in connection with the embodiment of Fig. 41. The gyroscope 193 may be employed, for example, to measure the roll of an aircraft, ship or other vehicle if the in-line shafts 179 and 189 are mounted perpendicular to the long axis of the vehicle. The rotors 177 and 187 of the condensers $C_1$ and $C_2$ are shown oppositely oriented such that as the gimbal 191 rotates about the axis formed by the shafts 179—189 in response to the roll of the vehicle or other force, condenser $C_1$ will increase or decrease while condenser $C_2$ respectively simultaneously decreases or increases. There will thus result in the output circuit 2—4 a direct-current voltage that is a measure of the amount of movement of the gimbal 191 about its axis, and hence a measure of the amount of roll of the vehicle. It is, of course, to be understood that the gyroscope 193 and gimbal 191 may take any conventional form and that the condensers $C_1$ and $C_2$ similarly may be of any type. If desired, furthermore, the gimbal shaft 179—189 may rotate a condenser dielectric medium within a fixed rotor and stator to vary the capacitors $C_1$ and $C_2$, thereby completely isolating the gyroscope electrically. The resulting voltage in the output circuit 2—4 may be fed to conventional correcting mechanisms for righting the vehicle as discussed in connection with the system of Fig. 31, or may be fed to an indicator, or used in any other conventional manner. Among the advantages of the use of the present invention as gyroscope pick-offs instead of present-day contact pick-offs are the continuous voltage indications, the high sensitivity and the substantially torque-less operation.

A schematic diagram is presented in Fig. 41 illustrating the application of three transducers 1, 121 and 141, each associated with respective gimbals of a gyroscope system 193 for producing voltages corresponding to three degrees of motion of the gyroscope system. Such a system may be employed, for example, in an automatic pilot system. The gyroscope mechanism 193 is shown provided with the gimbal 191 having in-line shafts 189 and 179, as previously discussed in connection with Fig. 40. A dotted line is shown drawn from the shaft 179—189 to the variable mechanisms of the variable condensers $C_1$ and $C_2$. This showing is intended to illustrate, in simplified form, arrangements such as the mechanical connections of Fig. 40 by means of which the condenser plates may be varied in accordance with rotations of the gimbal 191 about the axis 179—189, in the directions of the arrows. The identical electrical connections described in connection with the system of Fig. 40 are shown applied to the circuit of the tube 1 of Fig. 41 so that the circuit need not further be discussed. The output circuit 2—4 is shown, for purposes of illustration, connected to a meter $M_1$, which may indicate movement of the gimbal 191 in response to, for example, the roll of the vehicle upon which the gyroscope system is mounted. The plane of the gimbal 191 is normally vertical, the shaft 179—189 being illustrated as mounted within a second horizontal gimbal 195 rotatable about a shaft 197—199 that, in turn, may rotate in the directions of the arrows shown about the shaft 199, within still a further gimbal 201 oriented in a plane normal to the planes of the gimbals 195 and 191. The third gimbal 201 may rotate about a shaft 203—205 in the directions of the arrows adjacent the shaft 205. Rotations of the shaft 203—205 control the condensers $C_1'$ and $C_2'$ that correspond, respectively, to the condensers $C_1$ and $C_2$ of the circuit connected to the tube 1, in the same manner as discussed in connection with Fig. 40. Similarly, in response to rotations of the shaft 197—199 of the gimbal 195, condensers $C_1''$ and $C_2''$, connected to the tube 141, may be varied in the same manner discussed in connection with the embodiment of Fig. 40. The output circuit $2'$—$4'$ of the tube 121 is shown feeding a meter or indicator $M_2$ which will, therefore, indicate the degree of rotation of the shaft 205. Similarly, the output circuit $2''$—$4''$ of the tube 141 will indicate upon an indicator $M_3$ the degree of rotation of the shaft 197—199 of the gimbal 195. Since the gyroscope system 193 is thus provided with three degrees of freedom, there will appear in the indicators $M_1$, $M_2$ and $M_3$ indications representative of the amount of motion of the gyroscope system along each of three coordinates.

It is to be understood, however, that, if desired, only two degrees of freedom may be employed by using only two gimbals, and that the meters or other indicators $M_1$, $M_2$ and $M_3$ may be replaced by any other type of voltage-responsive circuit, such as a circuit for righting the craft in which the gyroscope system is mounted, as treated in the discussion of Fig. 31. Though the plurality of tubes 1, 121 and 141 are shown energized by separate generators, moreover, a common oscillator or other generator may energize all of the transducers. It is also to be understood that any of the other embodiments of the invention may, of course, be employed in substitution for the particular transducer circuit illustrated.

There are also other ways of employing the present invention in connection with gyroscopes. In the embodiment of Fig. 42, for example, the gimbal 191 of the gyroscope 193 is shown rotatable about its gimbal shaft 179—189 within supports 183 and 181 corresponding to those previously discussed. The shaft portion 189, however, is shown extending through the support 181 and then bending upward to form a rotatable eccentric electrode 205. The eccentric electrode 205 may rotate about the axis of the shaft 179—189 in response to movement of the gimbal 191. A counter-weight 207 is shown connected to an extension of the opposite shaft portion 179 through the support 183 to balance the movable electrode arm 205. A transducer 1 of the same type previously discussed in connection with the embodiment of Fig. 28 is arranged with its axis substantially in line with the shaft 179—189 so that the electrode arm 205, to which one terminal of the generator 17 is connected, may rotate about the tube 1, varying the potential gradients between the principal electrodes 3 and 5 as it does so. There will be produced in the output circuit 2—4, therefore, direct-current voltages that are measures of the amount of rotation of the shaft 179—189 in response to movement of the gimbal 191.

As still another illustration, the tube 1 may be curved as before discussed in connection with the embodiment of Fig. 3 and in the said copending application, to have a radius of curvature substantially that of the gimbal 191, though somewhat larger, as will later be discussed. The principal electrodes 3 and 5 of the tube 1 in Fig. 43 are shown connected through respective condensers $C_1$ and $C_2$ to one terminal of the generator 17. The other terminal of the generator 17 is connected by a flexible conductor to a ring electrode 9 that may be integral with the topmost portion of gimbal 191 and hence in-line with the vertical axis of the gyroscope 193. The tube 1 fits within the ring electrode 9 so that its radius of curvature is slightly greater than the radius of the gimbal 191, as before mentioned. As the gimbal 191 rotates about the axis 179—189, accordingly, the movable ring electrode 9 moves along the arc of the tube 1, closer to or farther from one or the other of the principal electrodes 3 and 5, producing in the output circuit 2—4 voltages related to the degree of the movement of the gimbal 191 and of polarity dependent upon the direction of motion.

It is to be understood that the types of systems illustrated in Figs. 42 and 43 may equally well be applied to two or three degrees of freedom, as discussed in connection with the embodiment of Fig. 41. All of the gyroscope systems, moreover, may be operated with modulated generators 17, as described in Figs. 4, 5 and 39. As an illustration, 400-cycle modulation may be placed upon the radio-frequency oscillations of the generator 17.

As still a further example of the versatile character of the present invention, illustrative of its application to control circuits, an apparatus is shown in Fig. 44 with the aid of which a bath or other medium 211 may be kept at a constant temperature. Inserted in the bath or other medium 211 may be a temperature-responsive device such as, for example, a bi-metal strip 207, connected at one end to the ring electrode 9 of a transducer 1 and at the other end to a fixed support 209 within the bath 211. The bi-metal strip controls the position of the electrode 9 in accordance with the temperature of the bath 211 in a fashion similar to that previously discussed in connection with the embodiment of Fig. 26. Inserted in or adjacent the bath 211 may be a heating unit, such as a wire resistor 213, and a cooling unit, such as a refrigeration coil 215 connected to a refrigerating unit 217 that may be driven by a motor 219. The output of the transducer 1 of the present invention may be used to control the heating unit 213 or the cooling unit 215, depending upon its polarity, which, in turn, depends upon the direction of movement of the bi-metal strip 207. The output circuit 2—4 of the tube 1, for example, may be connected to a switching or distributor unit, having a movable switch contactor member 221. This switch member may, for example, comprise the needle of a moving-coil meter device 223, connected in the output circuit 2—4. When the polarity of the output voltage has one value, the switch 221 is moved to contact a left-hand terminal 225, thereby to connect the heating wire 213 across a mains or other voltage source 227 in order to heat the solution or other medium 211. When the direct-current voltage in the output circuit 2—4 reverses, as when the solution or other medium becomes too hot, the current in the device 223 will reverse in response to the reverse movement of the bimetal strip 207 and hence of the ring electrode 9, moving the switch 221 to the right-hand terminal 229, disconnecting the heater 23 from the mains 227 and connecting the motor 219 across the mains 227 instead, thereby to drive the refrigeration motor 217 to operate the cooling coil 215.

Further modifications will occur to those skilled in the art and all such are considered to fall within the spirit and scope of the present invention as defined in the appended claims.

What is claimed is:

1. An electric system having, in combination, a gaseous-discharge tube provided with two electrodes between which alternating-current potential gradients may be established to ionize the gas in the tube, an output circuit connected between the electrodes, means for producing an alternating-current electric field modulated with a predetermined modulation envelope to establish corresponding modulated potential gradients between the electrodes in order to ionize the gas in the tube thereby to produce a direct-current voltage corresponding to the modulation envelope in the output circuit without the aid of a source of energy therein, signal-controlled means for varying the modulated potential gradients between the electrodes to produce corresponding signal variations in the said voltage produced in the output circuit, and voltage-responsive means connected in the output circuit.

2. An electric system having, in combination, a gaseous-discharge tube provided with two electrodes, an output circuit connected between the electrodes, means for producing a radio-frequency field modulated with a predetermined modulation envelope and of sufficient magnitude to establish corresponding modulated potential gradients between the electrodes in order to ionize the gas in the tube thereby to produce a direct-current voltage corresponding to the modulation envelope in the output circuit without the aid of a source of energy therein, signal-controlled means for varying the modulated potential gradients between the electrodes to produce corresponding signal variations in the said voltage produced in the output circuit, and voltage-responsive means connected in the output circuit.

3. An electric system having, in combination, an ionizable medium provided with two electrodes, an output circuit connected between the electrodes, and means for producing within the medium an alternating electric field modulated with a predetermined modulation envelope to ionize the medium thereby to produce a direct-current voltage corresponding to the modulation envelope in the output circuit without the aid of a source of energy therein.

4. An electric system having, in combination, means comprising an ionizable medium provided with two electrodes between which potential gradients may be established to ionize the medium, an output circuit connected between the electrodes, means for producing an alternating-current electric field modulated with a predetermined modulation envelope to establish corresponding modulated potential gradients between the electrodes in order to ionize the medium thereby to produce a direct-current voltage corresponding to the modulation envelope in the output circuit in response to the ionization of the medium without the aid of a source of energy therein, signal-controlled means for varying the potential gradients between the electrodes to produce corresponding signal variations in the said voltage produced in the output circuit, and voltage-responsive means connected in the output circuit.

5. The system of claim 4 and in which the voltage-responsive means comprises a control circuit.

6. The system of claim 4 and in which the voltage-responsive means comprises a circuit for operating a motor.

7. The system of claim 4 and in which the voltage-responsive means comprises an indicator.

8. An electric system having, in combination, means comprising an ionizable medium provided with two electrodes between which potential gradients may be established to ionize the medium, an output circuit connected between the electrodes, means for producing an alternating-current electric field modulated with a predetermined modulation envelope to establish corresponding modulated potential gradients between the electrodes in order to ionize the medium thereby to produce a direct-current voltage corresponding to the modulation envelope in the output circuit in response to the ionization of the medium without the aid of a source of energy therein, means for producing a signal, and means controlled in accordance with the signal for varying the potential gradients between the electrodes to produce corresponding signal variations in the said voltage produced in the output circuit.

9. The system of claim 8 and in which the signal-producing means comprises means controlled in accordance with linear movements.

10. The system of claim 8 and in which the signal-producing means comprises means controlled in accordance with angular movements.

11. The system of claim 8 and in which the signal-producing means comprises means controlled in accordance with movements related to a predetermined function.

12. The system of claim 8 and having means connected in the output circuit for varying the direct-current level of the output voltage.

13. The system of claim 8 and in which the signal-producing means comprises an electromagnetic device.

14. An electric system having, in combination, a plurality of means each comprising an ionizable medium provided with two electrodes between which potential gradients may be established to ionize the medium, a plurality of output circuits, one connected between the electrodes of each ionizable medium, whereby voltages may be produced in the respective output circuits in response to the ionization of the respective media without the aid of a source of energy therein, and means for algebraically adding the output voltages.

15. An electric system having, in combination, an ionizable medium provided with at least two pairs of electrodes between which potential gradients may be established to ionize the medium, each pair of electrodes lying in a different plane, and a plurality of output circuits, one connected between each pair of electrodes, whereby voltages may be produced in the respective output circuits in response to the ionization of the medium without the aid of a source of energy therein.

16. An electric system having, in combination, an ionizable medium provided with three electrodes between which potential gradients may be established to ionize the medium, the three electrodes being disposed so that they have no common plane, a first output circuit connected between two of the electrodes and a second output circuit connected between one of the said two electrodes and the third electrode whereby voltages may be produced in the output circuits in response to the ionization of the medium without the aid of a source of energy therein.

17. An electric system having, in combination, an ionizable medium provided with two electrodes, an output circuit connected between the electrodes, means for producing an alternating-current electric field modulated with a predetermined modulation envelope and having a field pattern representative of a predetermined function thereby to ionize the medium and to produce a direct-current voltage corresponding to the modulation envelope in the output circuit without the aid of a source of energy therein, and means for varying the relative position of the medium and the electric field in order that the output voltage may vary in response to the variation of position in accordance with a further function of the said predetermined function.

18. An electric system having, in combination, a gaseous-discharge tube bent in the form of an arc, and provided with two principal electrodes between which potential gradients may be established to ionize the gas and an auxiliary electrode the position of which may be varied along the arc with respect to the principal electrodes, and an output circuit connected between the two principal electrodes whereby a voltage may be produced in the output circuit in response to the ionization of the gas without the aid of a source of energy therein.

19. An electric system having, in combination, means comprising an ionizable medium provided with two electrodes between which alternating-current potential gradients may be established to ionize the medium, an output circuit connected between the electrodes, means for producing an alternating-current electric field modulated with a predetermined modulation envelope to establish modulated potential gradients whereby under conditions of potential-gradient asymmetry a direct-current voltage corresponding to the modulation envelope may be produced in the output circuit without the aid of a source of energy therein, signal-controlled means for rendering the potential gradients asymmetric between the electrodes, means for operating the signal-controlled means in response to a signal within limits such that the relationship between the degree of signal-produced asymmetry and the voltage in the output circuit remains substantially linear, and direct-current-voltage-responsive means connected in the output circuit for responding to the signal-produced direct-current voltages.

20. An electric system having, in combination, means comprising an ionizable medium provided with two electrodes between which alternating-current potential gradients may be established to ionize the medium, an output circuit connected between the electrodes whereby under conditions of potential-gradient asymmetry a direct-current voltage may be produced in the output circuit without the aid of a source of energy therein, means for producing symmetrical alternating-current potentials modulated with a predetermined modulation envelope upon the two electrodes in order initially to produce no voltage in the output circuit, signal-responsive means, means controlled in accordance with the signal-responsive means for rendering the modulated potential gradients asymmetric between the electrodes in accordance with a signal, thereby to produce corresponding signal-following direct-current voltages corresponding to the modulation envelope in the output circuit, and direct-current-voltage-responsive means connected in the output circuit for responding to the signal-produced modulation-envelope-corresponding direct-current voltages.

21. An electric system having, in combination, a gaseous-discharge tube provided with two principal electrodes and an auxiliary electrode between which alternating-current potential gradients may be established to ionize the gas in the tube, an output circuit connected between the principal electrodes, means for producing an alternating current field modulated with a predetermined modulation envelope and applying the same between the auxiliary electrode and the principal electrodes to establish therebetween corresponding modulated potential gradients in order to ionize the gas in the tube thereby to produce a direct-current voltage corresponding to the modulation envelope in the output circuit without the aid of a source of energy therein, signal-controlled means for varying the impedance between the auxiliary electrode and at least one of the principal electrodes to vary the modulated potential gradients between the electrodes thereby to produce corresponding signal variations in the said voltage produced in the output circuit, and voltage-responsive means connected in the output circuit.

22. An electric system having, in combination, a gaseous-discharge tube provided with two principal electrodes and an auxiliary electrode between which alternating-current potential gradients may be established to ionize the gas in the tube, an output circuit connected between the principal electrodes, means for producing an alternating current field modulated with a predetermined modulation envelope and applying the same between the auxiliary electrode and the principal electrodes to establish therebetween corresponding modulated potential gradients in order to ionize the gas in the tube thereby to produce a direct-current voltage corresponding to the modulation envelope in the output circuit without the aid of a source of energy therein, signal-controlled means for producing relative movement between the auxiliary and principal electrodes to vary the modulated potential gradients between the electrodes thereby to produce corresponding signal variations in the said voltage produced in the output circuit, and voltage-responsive means connected in the output circuit.

23. An electric system having, in combination, a gaseous-discharge tube provided with two principal electrodes and an auxiliary electrode between which alternating-current potential gradients may be established to ionize the gas in the tube, an output circuit connected between the principal electrodes, means for producing an alternating current field modulated with a predetermined modulation envelope and applying the same between the auxiliary electrode and the principal electrodes to establish therebetween corresponding modulated potential gradients in order to ionize the gas in the tube thereby to produce a direct-current voltage corresponding to the modulation envelope in the output circuit without the aid of a source of energy therein, signal-controlled means comprising a variable impedance element connected between the auxiliary electrode and at least one of the principal electrodes to vary the modulated potential gradients between the electrodes thereby to produce corresponding signal variations in the said voltage produced in the output circuit, and voltage-responsive means connected in the output circuit.

24. An electric system having, in combination, means comprising an ionizable medium provided with two electrodes between which potential gradients may be established to ionize the medium, an output circuit connected between the electrodes, means for producing an alternating-current electric field modulated with a predetermined modulation envelope to establish corresponding modulated potential gradients between the electrodes in order to ionize the medium thereby to produce a direct-current voltage corresponding to the modulation envelope in the output circuit in response to the ionization of the medium without the aid of a source of energy therein, signal-controlled means for varying the potential gradients between the electrodes to produce corresponding signal variations in the said voltage produced in the output circuit, and voltage-responsive means connected in the output circuit comprising a circuit for feeding back at least part of the output voltage to control the signal-controlled means.

25. An electric system having, in combination, means comprising an ionizable medium provided with two electrodes between which potential gradients may be established to ionize the medium, an output circuit connected between the electrodes whereby a voltage may be produced in the output circuit in response to the ionization of the medium without the aid of a source of energy therein, signal-controlled means for varying the potential gradients between the electrodes to produce corresponding variations in the voltage in the output circuit, and voltage-responsive means connected in the output circuit comprising a circuit for feeding back at least part of the output voltage to control the signal-controlled means.

26. An electric system having, in combination, means comprising an ionizable medium provided with two electrodes between which potential gradients may be established to ionize the medium, an output circuit connected between the electrodes, means for producing an alternating-current electric field of a predetermined frequency modulated with a predetermined modulation envelope to establish corresponding modulated potential gradients between the electrodes in order to ionize the medium thereby to produce a direct-current voltage corresponding to the modulation envelope in the output circuit in response to the ionization of the medium without the aid of a source of energy therein, means for producing a signal, means controlled in accordance with the signal for varying the potential gradients between the electrodes to produce corresponding signal variations in the said voltage produced in the output circuit, and an oscillatory circuit connected in the said output circuit tunable to frequencies in the region of the said predetermined frequency.

27. An electric system having, in combination, means comprising an ionizable medium provided with two electrodes between which potential gradients may be established to ionize the medium, an output circuit connected between the electrodes, means for producing an alternating electric field of a predetermined frequency to establish the said potential gradients between the electrodes whereby a voltage may be produced in the output circuit in response to the ionization of the medium without the aid of a source of energy therein, means for producing a signal, means controlled in accordance with the signal for varying the potential gradients between the electrodes to produce corresponding variations in the voltage in the output circuit, and an oscillatory circuit connected in the said output circuit tunable to frequencies in the region of the said predetermined frequency.

28. An electric system having, in combination, a plurality of means each comprising an ionizable medium provided with two electrodes between which potential gradients may be established to ionize the medium, a plurality of output circuits, one connected between the electrodes of each ionizable medium, means for producing an alternating electric field modulated with a predetermined modulation envelope to establish corresponding modulated potential gradients between the electrodes of each of the plurality of means in order to ionize the medium thereof thereby to produce a direct-current voltage corresponding to the modulation envelope in the respective output circuits in response to the ionization of the respective media without the aid of a source of energy therein, means for varying the potential gradients established in each medium a predetermined quantity correspondingly to vary the voltage produced in the respective output circuit, and means for algebraically adding the output voltages to obtain the sum or difference of the predetermined quantities.

29. An electric system having, in combination, a plurality of means each comprising an ionizable medium provided with two electrodes between which potential gradients may be established to ionize the medium, a plurality of output circuits, one connected between the electrodes of each ionizable medium whereby voltages may be produced in the respective output circuits in response to the ionization of the respective media without the aid of a source of energy therein, means for varying the potential gradients established in each medium a predetermined quantity correspondingly to vary the voltage produced in the respective output circuit and means for algebraically adding the output voltages to obtain the sum or difference of the predetermined quantities.

30. An electric system having, in combination, an ionizable medium provided with at least two pairs of electrodes between which potential gradients may be established to ionize the medium, each pair of electrodes lying in a different plane, a plurality of output circuits one connected between each pair of electrodes, means for producing an alternating electric field modulated with a predetermined modulation envelope to establish corresponding modulated potential gradients between the pairs of electrodes in order to ionize the medium therebetween thereby to produce a direct-current voltage corresponding to the modulation envelope in the respective output circuits in response to the ionization of the medium without the aid of a source of energy therein, and means for varying the potential gradients between the pairs of electrodes in the respective planes in order to produce corresponding voltage variations in the respective output circuits.

31. An electric system having, in combination, an ionizable medium provided with at least two pairs of electrodes between which potential gradients may be established to ionize the medium, each pair of electrodes lying in a different plane, a plurality of output circuits, one connected between each pair of electrodes whereby voltages may be produced in the respective output circuits in response to the ionization of the medium without the aid of a source of energy therein, and means for varying the potential gradients between the pairs of electrodes in the respective planes in order to produce corresponding voltage variations in the respective output circuits.

References Cited in the file of this patent

UNITED STATES PATENTS

| Number | Name | Date |
| --- | --- | --- |
| 781,603 | Hewitt | Jan. 31, 1905 |
| 1,144,596 | Hewitt | June 29, 1915 |
| 1,627,231 | Chaffee | May 2, 1927 |
| 1,768,660 | Brackett | July 1, 1930 |
| 2,004,368 | Crossley | June 11, 1935 |
| 2,149,847 | Kolin | Mar. 7, 1939 |
| 2,152,639 | Edgerton | Apr. 4, 1939 |
| 2,272,794 | Kramolin | Feb. 10, 1942 |
| 2,544,078 | Glassbrok | Mar. 6, 1951 |
| 2,602,914 | Schlesman et al. | July 8, 1952 |

OTHER REFERENCES

Gasentladungen bei Sehr Hohen Frequenzen, by Lothar Rohde, pp. 569–599, Annalen Der Physik, vol. 12, 1932; esp. pp. 591 and 592.

Gasentladungen bei Sehr Hohen Frequenzen, by Lothar Rohde, pp. 550 and 551, Physikalische Zeitschrift, vol. 32, 1931.